US011905986B1

(12) United States Patent
Gulli et al.

(10) Patent No.: US 11,905,986 B1
(45) Date of Patent: Feb. 20, 2024

(54) QUICK-ACCESS FASTENER ASSEMBLY FOR HIGH TEMPERATURE APPLICATIONS

(71) Applicant: BLUE ORIGIN LLC, Kent, WA (US)

(72) Inventors: Stefano Gulli, Kent, WA (US); Adam Norman, Kent, WA (US); Chris Hupf, Kent, WA (US); John Brendel, Kent, WA (US); Sean Lay, Kent, WA (US); Pierce Louderback, Kent, WA (US)

(73) Assignee: Blue Origin LLC, Ken, WA (US)

( * ) Notice: Subject to any disclaimer, the term of this patent is extended or adjusted under 35 U.S.C. 154(b) by 417 days.

(21) Appl. No.: 17/009,531

(22) Filed: Sep. 1, 2020

(51) Int. Cl.

| | |
|---|---|
| ***F16B 37/14*** | (2006.01) |
| ***F16B 5/01*** | (2006.01) |
| ***F16B 35/04*** | (2006.01) |
| ***B64G 1/58*** | (2006.01) |
| ***F16B 37/08*** | (2006.01) |

(52) U.S. Cl.
CPC ................ *F16B 35/04* (2013.01); *B64G 1/58* (2013.01); *F16B 5/01* (2013.01); *F16B 37/0807* (2013.01); *F16B 37/14* (2013.01)

(58) Field of Classification Search
CPC ...... F16B 37/14; F16B 5/01; F16B 2043/008; F16B 19/02
USPC ....................................... 411/372.5–377, 531
See application file for complete search history.

(56) References Cited

U.S. PATENT DOCUMENTS 3,088,361 A * 5/1963 Hallock .................. F16B 15/02 52/363
3,892,099 A * 7/1975 Worgan ..................... F16B 5/00 52/483.1
4,056,878 A * 11/1977 Woodley ................... F16B 5/01 411/965
4,577,450 A * 3/1986 Large ........................ F16B 5/01 428/116
4,749,298 A 6/1988 Bundt et al.
4,959,938 A 10/1990 De Caro
5,391,028 A 2/1995 Charles
5,536,124 A * 7/1996 Silva ..................... F16B 33/004 411/533
6,315,485 B1 * 11/2001 Speck ..................... F16B 37/14 403/404
6,406,210 B1 * 6/2002 Parrish ...................... F16B 5/02 411/107

(Continued)

FOREIGN PATENT DOCUMENTS

EP 2740851 B1 8/2017

*Primary Examiner* — Flemming Saether
(74) *Attorney, Agent, or Firm* — K&L Gates LLP

(57) ABSTRACT

Embodiments disclosed herein include fastener assemblies. In an embodiment, a fastener assembly comprises a sleeve with a hole, an inner surface, and top and bottom ends. The top end has a planar surface, and the inner surface has a cylindrical surface. The fastener assembly includes a fastener downwardly extending through the hole, and having a drive slot, a head, a shank, and a threaded region. The head is positioned within the bottom end. The head is separated from the threaded region by the shank. The fastener assembly comprises a cover disposed on the top end and having an access hole and top and bottom surfaces. The cover is welded to the sleeve to define an inner cavity between the cover, sleeve, and fastener head. The access hole is positioned over the drive slot. The cover, sleeve, and fastener comprises materials having high temperature, strength and oxidation resistances.

15 Claims, 10 Drawing Sheets

(56) References Cited

U.S. PATENT DOCUMENTS

| | | | | |
|---|---|---|---|---|
| 6,718,774 | B2 | 4/2004 | Razzell | |
| 6,796,091 | B2 * | 9/2004 | Elmer | E06B 3/5436 52/235 |
| 8,056,862 | B1 | 11/2011 | Tomerlin et al. | |
| 8,057,146 | B2 * | 11/2011 | Zeytoonian | H01J 37/32458 411/372.5 |
| 8,562,266 | B2 | 10/2013 | Sexton | |
| 8,568,072 | B2 * | 10/2013 | Suefuji | F16B 37/122 411/303 |
| 10,179,639 | B2 * | 1/2019 | Pretty | B64C 1/403 |
| 2006/0019762 | A1 | 1/2006 | Ford et al. | |
| 2008/0003078 | A1 | 1/2008 | Richards | |
| 2020/0332826 | A1 * | 10/2020 | Martinez | F16B 41/005 |

* cited by examiner

QUICK-ACCESS FASTENER ASSEMBLY FOR HIGH TEMPERATURE APPLICATIONS

TECHNICAL FIELD

Embodiments of the present disclosure relate to fastener assemblies, and more particularly to fastener assemblies used to securely attach thermal protection panels to high-temperature structures.

BACKGROUND

Certain vehicles, including space vehicles that enter a planetary atmosphere, must operate in a high-temperature environment, and require the use of a thermal protection system to protect them. Such thermal protection systems often employ surface materials able to withstand extreme heat and thermal insulation to inhibit the conduction of heat to the interior of the vehicle. Panels are formed of these materials, and these panels are affixed to vehicle surfaces typically using fasteners or adhesives.

The adhesives or fasteners used must also withstand high temperatures as well as the turbulence and surface friction experienced by the panels. To maintain substantially smooth, uninterrupted outer panel surfaces for the vehicles, thermal protection sealants, caps, or plugs are typically used to entirely cover and protect the fasteners. For example, the attachment of the fasteners to the thermally protective structures is usually recessed relative to the outer surface of the structures. The recess over the respective fastener heads is then entirely sealed, for example, with high-temperature silicone or compatible thermal protection system materials. However in order to remove the heat shield to access the vehicle structure, the thermal protection sealant, cap, plug, etc., must be removed in order to access the fastener heads. This is a time- and labor-intensive process that makes maintaining the vehicle significantly more difficult, time-consuming, and expensive.

Also, in the event any of thermal protection sealants, caps, plugs, etc., become dislodged or displaced, the underlying conductive fastener heads are then exposed to extreme heat and/or shock hazard during any of the vehicle flight operations. Under these conditions, an exposed fastener head becomes a potential short circuit that can conduct heat and/or electrical energy directly to the vulnerable overlying surface area of the vehicle to which the fastener is secured. This significantly compromises the structural integrity of the vehicle and exposes the entire vehicle to dangerous structural failure.

EMBODIMENTS OF THE DETAILED DESCRIPTION

Figure 1:
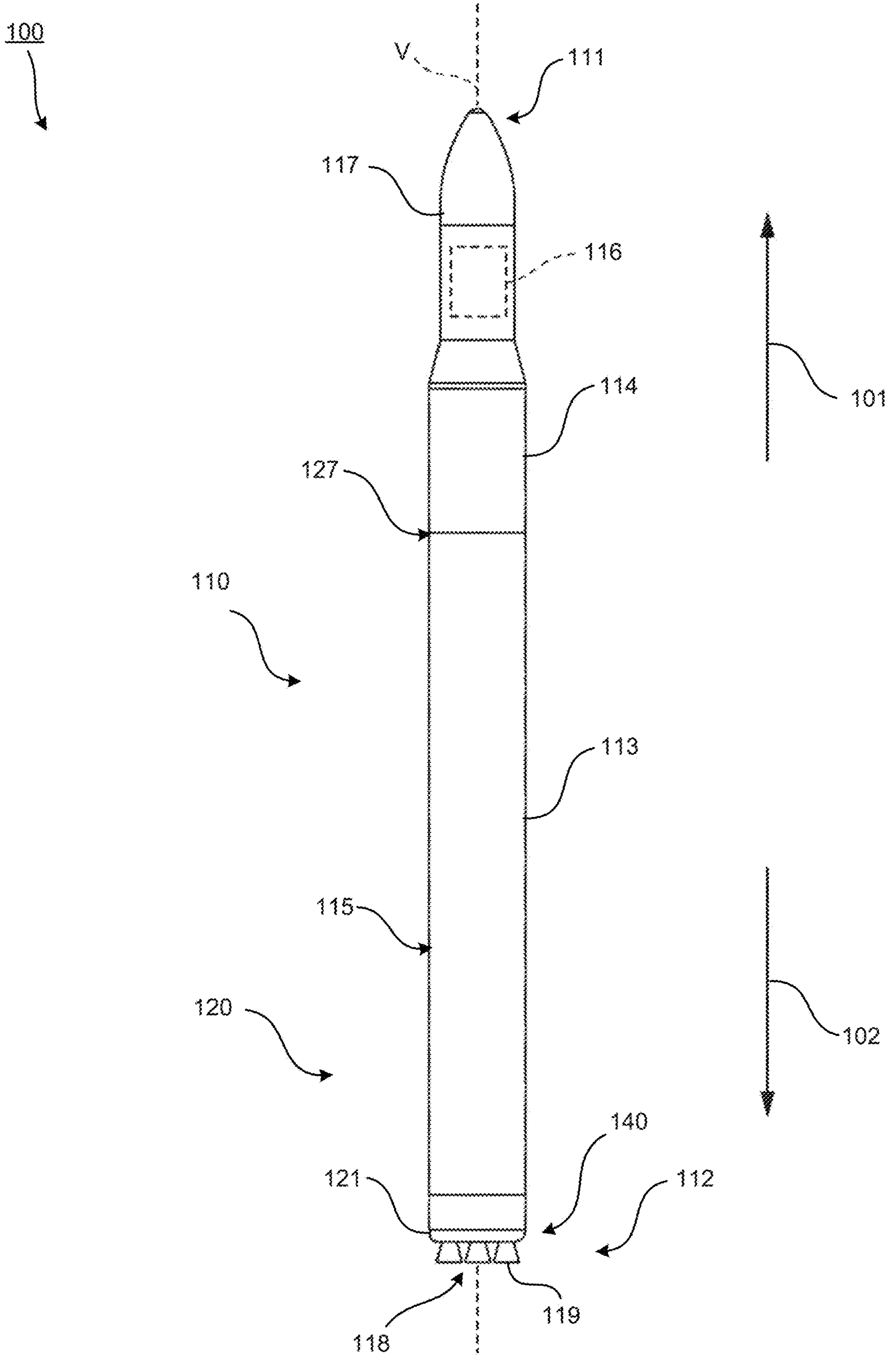
FIG. 1 is a partially schematic elevation view illustration of an exemplary launch vehicle system with thermal protection systems having fastener assemblies, in accordance with an embodiment.

Described herein are fastener assemblies, and thermal protection systems using the fastener assemblies to securely attach thermal protection panels to high-temperature structures, in accordance with various embodiments. In the following description, various aspects of the illustrative implementations will be described using terms commonly employed by those skilled in the art to convey the substance of their work to others skilled in the art. However, it will be apparent to those skilled in the art that the present invention may be practiced with only some of the described aspects.

Various operations may be described as multiple discrete operations, in turn, in a manner that is most helpful in understanding the present invention. However, the order of description should not be construed to imply that these operations are necessarily order dependent. In particular, these operations need not be performed in the order of presentation. For purposes of explanation, specific numbers, materials, and configurations are set forth in order to provide a thorough understanding of the illustrative implementations. In other instances, well-known features are omitted or simplified in order not to obscure the illustrative implementations.

As noted above, current thermal solutions are generally affixed to vehicles to protect the critical surfaces of a launch vehicle during such extreme temperature operations. Such thermal solutions include thermally protective cover structures attached to these surfaces of the launch vehicle, which may include a heat shield formed from the thermal protection panels. These structures are affixed using adhesive attachment mechanisms and/or mechanical fastener assemblies, and they must be removed in order to access components of the vehicle for inspection, repair, and refurbishment.

Using adhesive attachment mechanisms to secure thermal protection systems to a reusable launch vehicle typically involves several recurring problems. Adhesive attachment mechanisms make the panels difficult to remove, resulting in heightened labor, time, and costs during maintenance activities of the vehicle. Accordingly, these recurring issues have driven launch vehicle manufacturers to focus primarily on fastener systems to attach thermal protection systems to the launch vehicles. However, such approaches to use fastener assemblies also have their own integration issues.

In a leading approach, the attachment of the fastener to the thermal protection panel is recessed relative to the outer surface of the thermal protection panel in order to maintain a substantially smooth and continuous outer heat shield surface for the launch vehicle. In such an approach, the recessed opening is filled with an adhesively secured structure which entirely covers the fastener. The adhesively secured structure typically includes a thermally protective cap (or plug) that is typically formed of the same thermal material(s) as the thermal protection panel (e.g., high-temperature silicones or ceramics). The adhesively secured structure protects the fastener, but also seals the access hole used to engage the fastener head.

This approach is typically more cost effective than using adhesive attachments. However, the structural integrity, reliability, and safety of the resulting thermal protection systems are to some extent directly dependent upon the thermal protection caps. For example, in the event any of the caps become dislodged or displaced, the underlying conductive fastener (e.g., metallic fastener) is then exposed to extreme heat and/or shock hazard during any of the flight operations. Under these conditions, an exposed conductive fastener becomes a short circuit that conducts heat and/or electrical energy directly to the vulnerable overlying surface area of the launch vehicle to which the fastener is secured. Accordingly, the extreme heat and electrical energy conducted by the exposed fastener to the overlying supportive structures and components compromises the structural integrity, reliability, and safety of the entire launch vehicle and its payload, and ultimately exposes the vehicle, payload, and launch site to extremely dangerous and potentially life-threating results.

This leading approach is also becoming an even greater hurdle for vehicle manufacturers as launch vehicles are steadily increasing in size and, correspondingly, the total number of fastener assemblies in such vehicles also increases. For this approach, increasing the total number of fasteners also requires respectively increasing the total number of caps that are used to seal such fasteners. However, increasing the total number of sealed caps increases cost, time, and labor during the refurbishment process of such vehicles, as substantially more caps need to be removed to detach the fasteners in order to access the underlying vehicle structures and components. Accordingly, this approach is costly, time consuming, and labor intensive.

Faced with the critical need to provide safer, more reliable thermal protection systems for high-temperature structures, and the concurrent need for simultaneously reducing costs of fabrication, maintenance, and refurbishment of such thermal protection systems, another manufacturing approach has been provided to use an outer thermal protection layer (e.g., an insulation layer, a heat shield layer, etc.) that covers both fasteners and thermal protection panels. For example, in such approach, the fasteners have fastener heads with top surfaces that are substantially coplanar to a top surface of the thermal protection panel, and an outer thermal protection layer that is entirely disposed over the top surfaces of the fastener heads and the top surface of the thermal protection panel.

However, this approach is also problematic. In addition to raising the same issues suffered by the leading approach relating to the overall system integrity, reliability, and safety of such thermal protection systems, this approach suffers from poor accessibility. Particularly, in order to access the underlying vehicle structures and components below the thermal protection systems, the outer thermal protection layer must be peeled off. Accordingly, this approach is also costly, time consuming, and labor intensive—and also suffers from concerns due to the overall system integrity, reliability, and safety of such fasteners and thermal protection systems.

Accordingly, embodiments described herein include high-temperature structures with thermal protection systems that utilize quick-access fastener assemblies. The fastener assemblies include sleeves, covers, and fasteners with heads and threaded portions. The threaded portions extend through openings in the sleeves, while the heads are positioned entirely within the sleeves. Particularly, the covers are affixed via welding, crimping, or other method to the sleeves to completely secure and protect the fastener heads from any high-temperature environments. Alternatively, the covers could be integral with the sleeves.

In an embodiment, the covers have top surfaces that are substantially coplanar to the respective outer top surfaces of the thermal protection systems. The top surfaces of the covers also have holes that are positioned to be aligned with the respective fastener heads. The use of such holes allows for the fastener heads to be quickly engaged without needing to peel off an outer heat shield layer, and without needing to remove any type of caps, plugs, or the like. Additionally, the fastener assemblies are formed of heat resistant thermal protection materials to protect the respective high-temperature structures and thermal protection systems from any high-temperature environments. Accordingly, embodiments of such fastener assemblies are both cost-effective and practical, and provide a thermal protection system that allows for quick and unobstructed access to such fastener heads in conjunction with the ease of inspection and refurbishment of thermal protection panels and underlying structures without needing to remove any type of thermal protection layers, caps, or plugs.

Referring now to FIG. 1, a partially schematic elevation view of a launch vehicle system 100 with a launch vehicle 110 and one or more thermal protection systems 120 is shown, in accordance with an embodiment. The thermal protection systems 120 may be attached to the launch vehicle 110 using a plurality of fastener assemblies 140. In the illustrated embodiment, a single thermal protection system 120 with fastener assemblies 140 is shown on the launch vehicle 110. However, it is to be appreciated that any number of thermal protection systems 120 with multiple fastener assemblies 140 may be used on such launch vehicle 110. Examples of fastener assemblies 140 with multiple configurations are illustrated and described below in greater detail.

In an embodiment, the launch vehicle 110 includes a first end 111 and a second end 112 that is opposite to the first end 111. The launch vehicle 110 is capable of ascending and descending in opposite directions but with generally the same orientation (e.g., a tail-down orientation). For example, the launch vehicle 110 can ascend in a first direction 101 and descend in a second direction 102. In the illustrated embodiment, the launch vehicle 110 has a single two-stage vehicle configuration to enhance reliability and lower costs. However, it is to be appreciated that embodiments of the launch vehicle 110 may have any other vehicle configurations, including a single one-stage vehicle configuration, a single three-stage vehicle configuration, and so on.

In some embodiments, the launch vehicle 110 includes a first stage 113 and a second stage 114 that is assembled on the first stage 113. In such embodiments, the first stage 113 may be a booster (e.g., a reusable booster), while the second stage 114 may be an expandable stage that is used to propel a payload 116 and/or a payload fairing 117. The payload 116 and/or payload fairing 117 may carry humans, supplies, satellites, experiments, equipment, or the like. The payload fairing 117 may be a deployable aerodynamic fairing that protects the payload 116 and provides benign launch vehicle environments before and during flight. In other embodiments, the launch vehicle 110 may include any number of stages with any desired lengths.

As shown in FIG. 1, the launch vehicle 110 is elongated along a vehicle axis V and the payload 116 and payload fairing 117 may be positioned at the first end 111. In an embodiment, the launch vehicle 110 may omit the payload 116 and/or the payload fairing 117 based on the desired vehicle configuration and operations. The launch vehicle 110 may have a predetermined separation region 127 that is located between the first and second stages 113-114. The predetermined separation region 127 may be an interface location at which the first stage 113 separates from the second stage 114, typically during ascent.

The first stage 113 may include a body 115, a propulsion system 118, and the thermal protection system 120. In an embodiment, the body 115 may be comprised of one or more sections or modules (e.g., an aft module, a middle (or mid) module, and a forward module). In some embodiments, the aft module of the body 115 may include the thermal protection system 120, the propulsion system 118 with one or more nozzles 119, and a landing gear system with one or more landing gear. In some embodiments, the mid module of the body 115 may include one or more tanks (e.g., a liquid oxygen (LOX) tank, and a fuel or liquefied natural gas (LNG) tank filled with methane or the like), and one or more strakes on the aft end of the tank to provide the descending first stage 113 with enhanced cross-range descent and reentry. In some embodiments, the forward module of the body 115 may include one or more control fins (e.g., actuated aerodynamic control fins) to provide altitude control for the first stage 113 during descent, one or more control components (e.g., an autonomous flight safety system) to provide guidance navigation, stability, and control avionics for the first stage 113, and a pneumatic pusher stage separation system to provide positive separation before ignition of the second stage 114.

The propulsion system 118 with the nozzles 119 is positioned at the second end 112 of the launch vehicle 110. The nozzles 119 may be oriented to direct exhaust products in a generally downward direction (e.g., in the second direction 102). The nozzles 119 may be restartable thrust engines or the like that provide precision thrust vector control and continuous deep throttle capability to support propulsive deceleration and landing maneuvers for the first stage 113, and such engines may have a long design life. In the illustrated embodiments, three nozzles 119 are shown in the propulsion system 118. However, it is to be appreciated that embodiments include any number of nozzles 119, such as one nozzle, seven nozzles, or more than seven nozzles.

The propulsion system 118 may also include one or more combustion chambers. The combustion chambers may be located within the body 115, while each of the nozzles 119 may be coupled to one of the combustion chambers. For example, the combustion chambers may be used to receive fuel (or the like) from a pump that is coupled to the one or more tanks of the body 115. In such example, the fuel within the combustion chambers may be ignited with an igniter component. Upon ignition, the combustion chambers may create high energy exhaust products that are directed through the respective nozzles 119. The nozzles 119 are positioned to direct such exhaust products away from the second end 112 of the launch vehicle 110 (e.g., in the second direction 102). As such, the nozzles 119 may generate full thrust for the first stage 113 to propel the launch vehicle 110 towards the vehicle axis V and in the first direction 101.

Accordingly, as the launch vehicle 110 reaches a specific and predetermined elapsed time in the launch process (e.g., a specific altitude or speed, a specific amount of fuel consumed, etc.), the first and second stages 113-114 may separate from each other at the separation region 127 using the pneumatic pusher stage separation system or the like. After separation from the second stage 114, the first stage 113 may then be reoriented for atmospheric reentry, landing, and recovery, including performing a precision landing on a landing platform (e.g., an ocean-going platform located in the ocean or sea) to return the first stage 113 for inspection and reuse.

In an embodiment, after separation from the first stage 113, the second stage 114 may include a secondary propulsion system that initiates once adequate distance between such stages 113-114 is achieved. In some embodiments, the secondary propulsion system of the second stage 114 may be used to propel the payload 116 and payload fairing 117 towards outer space or a predetermined destination (e.g., a docking station), before initiating a payload separation process to separate the second stage 114 from the payload 116 and/or payload fairing 117. In other embodiments, the second stage 114 may not include a secondary propulsion system. In such embodiments both the first and second stages 113-114 may return back to earth, and one or both of the first and second stages 113-114 may be recovered and returned for inspection and reuse.

As the first stage 113 descends, the propulsion system 118 may use the nozzles 119 in conjunction with the other components in the aft module of the body 115 to stabilize and control the orientation and speed of the first stage 113. In the illustrated embodiment, the first stage 113 may then be controlled to stabilize and descend in the second direction 102 that is generally parallel to the vehicle axis V. For example, as the first stage 113 descends and approaches the landing platform, the first stage 113 may have a generally vertical orientation such that the second direction 102 and the vehicle axis V are both oriented perpendicular to the ground, while the nozzles 119 are directed downward with the exhaust products to decelerate the first stage 113. In an embodiment, the first stage 113 may have stowed landing gear (as described above) during ascent and descent that extends from the body 115 to support the weight of the first stage 113 during landing. After the first stage 113 lands on the landing platform, the propulsion system 118 may be shut down and the first stage 113 is then secured to the landing platform. Accordingly, the first stage 113 may be returned for inspection and refurbishment so that the first stage 113 can ultimately be reused for subsequent launches.

As noted above, the launch vehicle 110 is a high-temperature structure that is subjected to extreme conditions throughout the launching and landing processes. Accordingly, the thermal protection system 120 may be attached to the launch vehicle 110 with the fastener assemblies 140 to protect the launch vehicle 110 from such extreme conditions by arranging multiple thermal protection panels closely together and therein secured to form a heat shield layer 121 (or a heat shield) on/over any surface of the launch vehicle 110.

For example, the second end 112 of the first stage 113 is subjected to high air pressures and temperatures caused by friction between the air and the second end 112. To reduce the effects of such high temperatures, the thermal protection system 120 may be secured on the first stage 113 with the fastener assemblies 140, where such system 120 may be located at or at least toward the second end 112 to provide shielding, insulation, and/or other cooling systems for the first stage 113. In the illustrated embodiment, one thermal protection system 120 with one heat shield layer 121 and one set of fastener assemblies 140 is shown in the second end 112 of the first stage 113. However, it is to be appreciated that embodiments of the thermal protection systems 120 may be formed on any sections of the first stage 113, second stage 114, payload 116, payload fairing 117, and/or any other suitable structures of the launch vehicle 110.

Accordingly, the thermal protection system 120 may be attached to any surfaces, sections, and stages of the launch vehicle 110 that need thermal (or insulation) protection with the benefits of the fastener assemblies 140 described herein. For example, to protect the second end 112 from such high temperatures, the thermal protection system 120 may secure the heat shield layer 121 to the body 115 at the second end 112 using the fastener assemblies 140. The heat shield layer 121 may be positioned on any surfaces of the body 115 in order to insulate and protect any underlying components and structures within the first stage 113 from such high and extreme temperatures.

Figure 2:
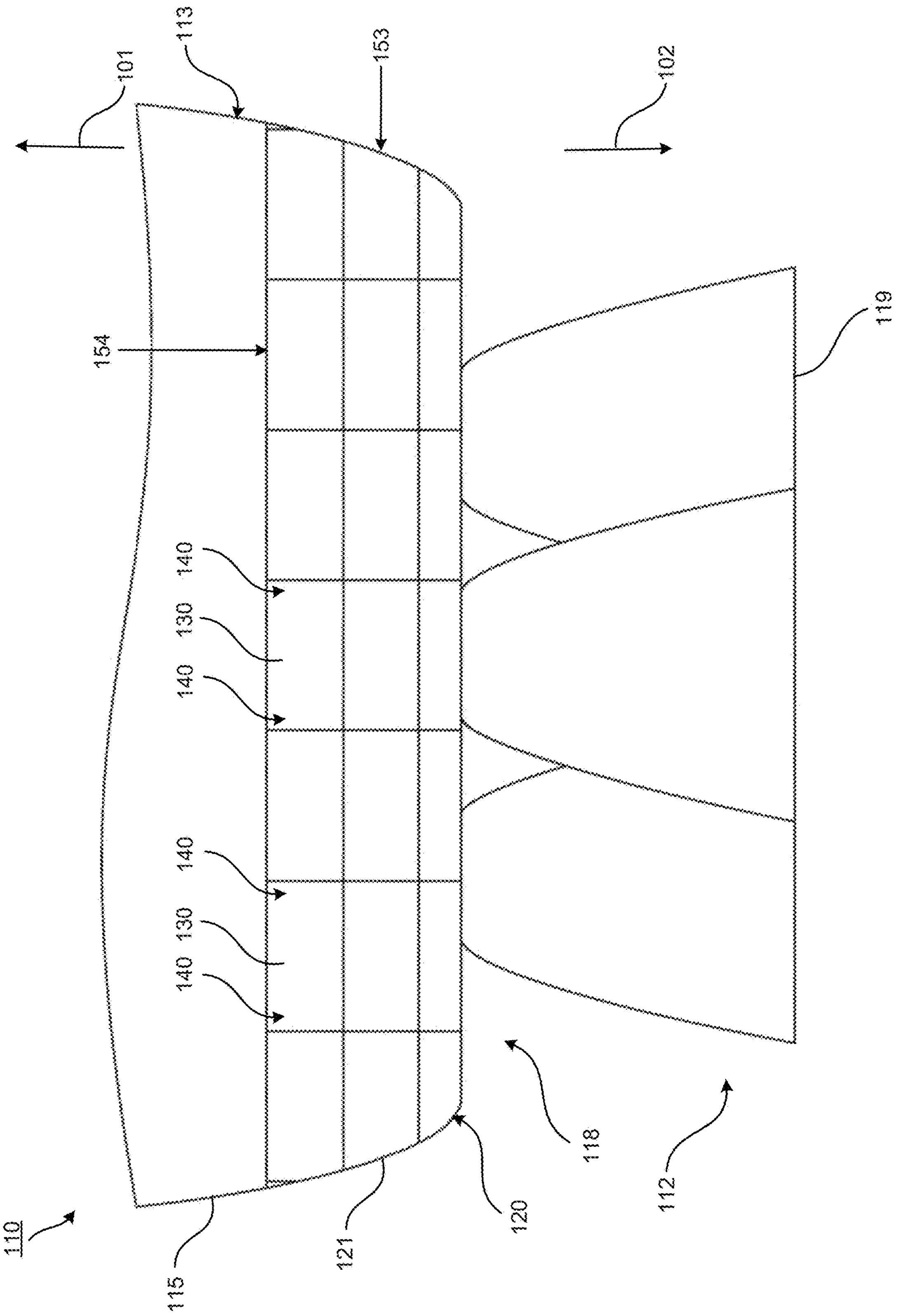
FIG. 2 is an enlarged partially schematic elevation view illustration of one end of the exemplary launch vehicle in FIG. 1 with a thermal protection system having a plurality of fastener assemblies and a heat shield that is formed from a plurality of thermal protection panels, in accordance with an embodiment.

Referring now to FIG. 2, an enlarged, partially schematic elevation view of the thermal protection system 120 in FIG. 1 that more clearly illustrates thermal protection panels 130 used to form the heat shield layers 121 with the fastener assemblies 140 is shown, in accordance with an additional embodiment. As shown in FIG. 2, the thermal protection system 120 may include one or more heat shields layers 121 that are attached to the launch vehicle 110 with the fastener assemblies 140. In the illustrated embodiment, one thermal protection system 120 with one heat shield layer 121 is used and respectively positioned on the first stage 113 near the second end 112 of such vehicle 110. However, it is to be appreciated that embodiments may include any number of thermal protection systems 120 with any number of heat shield layers 121 that may be attached to any stages (or bodies, sections, etc.) of such vehicle 110 at any desired end.

The heat shield layer 121 may be attached to the body 115 of the first stage 113 closely adjacent to the nozzles 119. The heat shield layer 121 is used to insulate the body 115 from high temperatures, for example, as the first stage 113 descends in the second direction 102. The heat shield layer 121 is formed from one or more thermal protection panels 130 (hereinafter also referred to as panels 130), which are tightly coupled next to each other and thereby securely attached to the body 115 using the fastener assemblies 140. For example, the thermal protection system 120 may utilize one or more configurations to arrange the fastener assemblies 140 within the thermal protection panels 130, which allows the fastener assemblies 140 to securely attach the respective panels 130 to the body 115, and provides increased thermal insulation to protect the body 115, the heat shield layer 121, the panels 130, the fastener assemblies 140, and any of the underlying structures and components. Examples of such configurations of the fastener assemblies 140 are provided below in greater detail.

The thermal protection panels 130 may be any type of thermal protection structures, apparatuses, or the like. In an embodiment, the thermal protection panels 130 may be a thermal protection structure comprising one or more insulation layers (e.g., ceramic layers) in conjunction with one or more conductive layers (e.g., metal layers). In some embodiments, the thermal protection panels 130 may include one or more insulation layers securely attached to one or more conductive layers using the fastener assemblies 140. For example, a thermal protection panel 130 may include an insulation layer positioned between two conductive layers that are securely attached to each other and the insulation layer using one or more fastener assemblies.

In an embodiment, the thermal protection panels 130 may be implemented as a thermal protection panel, access door, access window, or the like. In an embodiment, the thermal protection panels 130 may be modular and tightly arranged together in an array with a predetermined footprint that forms the heat shield layer 121 over the second end 112 of the body 115, and that fully covers all surfaces of the second end 112 of the body. In other embodiments, the thermal protection panels 130 may be arranged to fully cover one surface region of the second end 112, and partially cover another surface region of the second end 112. In some embodiments, the thermal protection panels 130 may be generally rectangular and planar (or the like). In other embodiments, one set of panels 130 may be rectangular and planar while another set of panels 130 may be curved, rounded, or substantially conformed to any underlying surface with any desired type of shape.

In the illustrated embodiment, the thermal protection panels 130 may be arranged with a selected configuration that forms a plurality of columns 154 and a plurality of rows 153 that intersect each other. For example, when the thermal protection panels 130 are attached to the body 115 at the second end 112, the columns 154 may be configured to be generally aligned along the vehicle axis V of the launch vehicle 110 (as shown in FIG. 1). As such, when the launch vehicle 110 is in flight, the columns 154 may be generally parallel to the first and second directions 101 and 102.

In some embodiments, the columns 154 of thermal protection panels 130 may be arranged adjacent to each other and separated from each other by a gap that is approximately equal to or less than 0.25 inches. In other embodiments, the adjacent columns 154 may be separated from each other by a gap with any desired distance.

In some embodiments, the thermal protection panels 130 may also be arranged with the rows 153 extending generally perpendicular to the columns 154. That is, the rows 153 are generally arranged perpendicular to the vehicle axis V shown in FIG. 1 and perpendicular to the first and second directions 101 and 102. In some embodiments, the rows 153 of adjacent thermal protection panels 130 may be spaced apart from each other by a gap that is approximately equal to the gap between adjacent columns 154. In other embodiments, the adjacent rows 153 may be spaced apart from each other by a gap that is different from the gap between adjacent columns 154.

Figure 3:
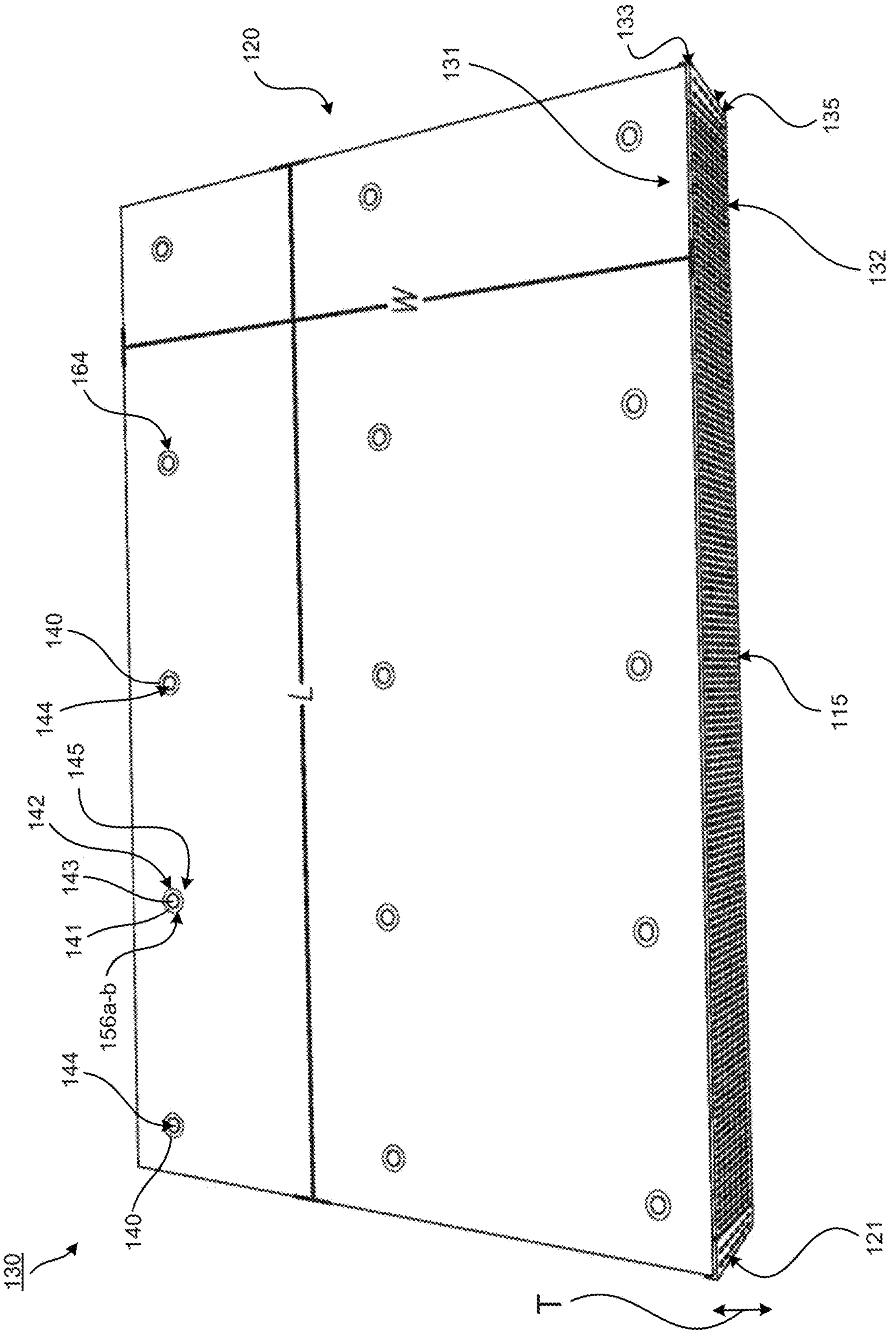
FIG. 3 is a perspective view illustration of a thermal protection panel having a plurality of fastener assemblies, in accordance with an embodiment.

Referring now to FIG. 3, a perspective view of one of the thermal protection panels 130 of the heat shield layer 121 in FIG. 2 that more clearly illustrates the fastener assemblies 140 is shown, in accordance with an additional embodiment. As shown in FIG. 3, the fastener assemblies 140 are positioned respectively within holes 164 that are formed through the illustrated thermal protection panel 130. Accordingly, in the illustrated embodiment, the fastener assemblies 140 are used to securely attach the illustrated panel 130 to the body 115. Similarly, in other embodiments similar to the illustrated embodiment in FIG. 3, the fastener assemblies 140 may be used to securely couple the illustrated panel 130—in conjunction with the other thermal protection panels 130 illustrated in FIG. 2—to form a substantially smooth continuous insulation layer that is positioned directly over the body 115 (i.e., the heat shield layer 121 as more clearly shown in FIG. 2).

Also, as shown in FIG. 3, the thermal protection panel 130 may be rectangular and planar with a length L, a width W, and a thickness T.

In an embodiment, the thermal protection panel 130 may include the heat shield layer 121 (or a portion of the heat shield layer 121) positioned between and attached to an outer conductive layer 133 and an inner conductive layer 135. With respect to one embodiment, the outer conductive layer 133 may define an outer surface 131 of the panel 130, while the inner conductive layer 135 may define an inner surface 132 of the panel 130. For example, when the thermal protection panel 130 is attached to the launch vehicle 110 in FIGS. 1-2, the panel 130 may be positioned such that the inner surface 132 faces towards the body 115, and the outer surface 131 faces away from the body 115 towards the outer ambient environment.

As noted and described above, the thermal protection panel 130 may include one or more holes 164 that are formed with any suitable process. The holes 164 may extend through the outer conductive layer 133, the heat shield layer 121, the inner conductive layer 135, and portions of the body 115. As shown in FIG. 3, both the holes 164 and the respective fastener assemblies 140 may be arranged in rows, columns, and/or any other desired configuration within the panel 130.

The fastener assemblies 140 may include sleeves 142, fasteners 143, thermal washers 156*a-b*, nut plates 145, and covers 141 with access holes 144. The fasteners 143 may be positioned entirely within the respective holes 164, while the respective covers 141 and sleeves 142 are also positioned within the respective holes 164 to surround and protect the respective heads of the fasteners 143. Particularly, as shown in FIG. 3, the covers 141 may be positioned on the outer surface 131 of the panel 130 and directly over the respective fasteners 143. In the illustrated embodiment, each of the covers 141 has one respective access hole 144 that is positioned directly over the respective fasteners 143, and enables quick and easy access to engage the heads of the respective fasteners 143.

In some embodiments, the fastener assemblies 140 may be configured to extend from the outer surface 131 to the inner surface 132 of the panel 130, i.e., the fastener assemblies 140 respectively extend through the outer conductive layer 133, the heat shield layer 121, and the inner conductive layer 135. In some embodiments, the fastener assemblies 140 are coupled to the outer surface 131, which secures the outer conductive layer 133 against the heat shield layer 121, and prevents the outer conductive layer 133 from detaching. Accordingly, embodiments of the fastener assemblies 140 greatly help the thermal protection panel 130 to securely couple the heat shield layer 121 to both the outer and inner conductive layers 133 and 135, which also facilitates the thermal protection system 120 to securely attach such thermal protection panel 130 to the body 115. Examples of such fastener assemblies 140 are provided below in greater detail.

FIGS. 4 and 7-9 set forth detailed cross-sectional illustrations of one of the fastener assemblies 140 in FIG. 3 that more clearly illustrate the configuration of the cover 141, the sleeve 142, and the fastener 143, and such configuration relative to the body 115 and the respective layers 133, 121, and 135 within the thermal protection panel 130, in accordance with some embodiments. Similarly, FIGS. 5A-5B set forth perspective and plan view illustrations of the cover and sleeve 141-142 in FIG. 4; while FIGS. 6A-6C set forth cross-sectional and perspective view illustrations of the welded cover and sleeve 141-142 of the fastener assembly 140 in FIG. 4, in accordance with some additional embodiments. In addition, the fastener assembly 140 in FIG. 4 may be configured with one or more additional thermal protection structures as shown below in FIGS. 7-9.

As noted above, embodiments of the fastener assemblies 140 described herein may be used with any type of high-temperature structures, air or space vehicle structures, and other suitable high-temperature, high-speed structures. However, it is to be appreciated that embodiments may include fastener assemblies 140 that may also be configured with other related high thermal insulation technologies, includings furnaces, kilns, power reactors, oil refinery tanks, boilers, nuclear reactors, or the like. Accordingly, specific details describing structures or processes that are well known and often associated with launch vehicles and/or thermal insulation systems, but that can unnecessarily obscure some aspects of the embodiments described herein, may not be set forth in the following description for purposes of clarity.

Figure 4:
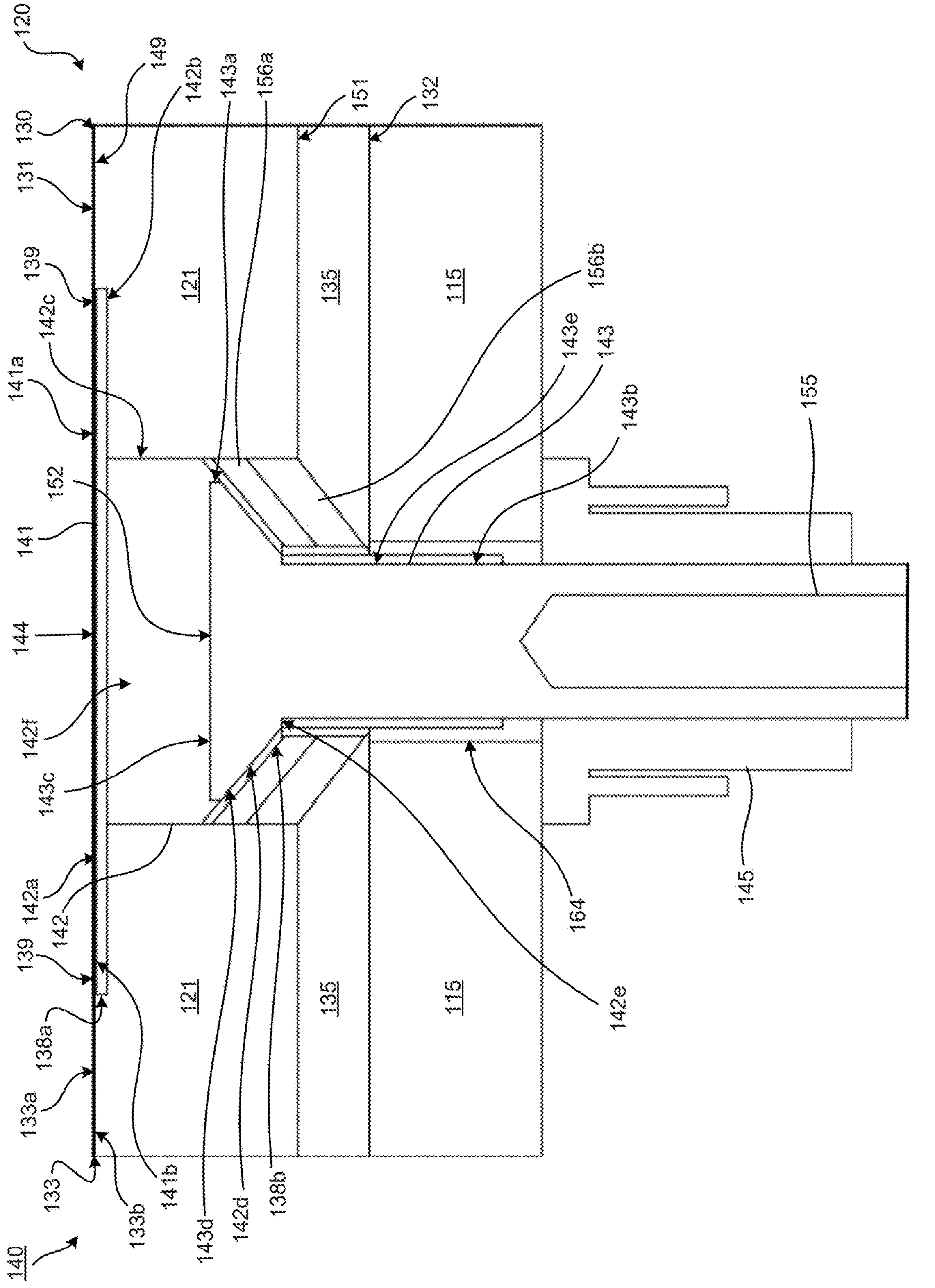
FIG. 4 is a detailed cross-sectional illustration of a fastener assembly used to attach a thermal protection panel in a thermal protection system, where the fastener assembly comprises a fastener, a sleeve, a cover, and a nut plate, in accordance with an embodiment. The assembly may also include one or more washers.

Referring now to FIG. 4, an enlarged, detailed cross-sectional illustration of the thermal protection panel 130 with one of the fastener assemblies 140 in FIG. 3 is shown, in accordance with an embodiment. The configuration of the fastener assembly 140 in FIG. 4 is the same configuration of the fastener assemblies 140 shown in FIG. 3. Accordingly, as shown in FIG. 4, the fastener assembly 140 includes a cover 141, a sleeve 142, a fastener 143, an access hole 144, a nut plate 145, and thermal washers 156*a-b*.

In the illustrated embodiment, the fastener 143 is positioned downwardly into the holes 164 that extends through the thermal protection panel 130 and the body 115. The fastener 143 may be any suitable type of elongated fastening mechanisms. For example, the fastener 143 may be a bolt, a stud, a rod, a pin, a screw, a helical insert, an extended projection, or the like. In an embodiment, the fastener 143 has a fastener head 143*a* and a threaded region 143*b*. For example, the fastener head 143*a* is positioned at a top end of the fastener 143, and the threaded region 143*b* is positioned at or around a bottom end of the fastener 143, where the bottom end may be defined as a tip of the fastener 143. In some embodiments, the fastener 143 may have the fastener head 143*a* separated from the threaded region 143*b* by a shank region 143*e* (or an unthreaded region). In one embodiment, the threaded region 143*b* may have a length that is greater than a length of the shank region 143*e*. In other embodiments, the fastener 143 may have the fastener head 143*a* positioned adjacent to the threaded region 143*b* (i.e., without having the shank region 143*e* in between the fastener head 143*a* and threaded region 143*b*).

The fastener 143 may also has a top surface 143*c*, a conical surface 143*d*, and a drive slot 152 within the top surface 143*c* of the fastener head 143*c*. The top surface 143*c* defines the top surface of the head 143*a*. As shown in FIG. 4, the fastener head 143*a* is positioned within the sleeve 142. For example, the top surface 143*c* is accessible within the sleeve 142 and faces upwardly towards the cover 141, while the conical surface 143*d* sits directly on the sleeve 142. In an embodiment, the sleeve 142 is positioned entirely within the thermal protection panel 130. Particularly, in some embodiments, the sleeve 142 is entirely (or substantially) surrounded by the heat shield layer 121. In other embodiments, the sleeve 142 may be surrounded by one or more of the outer conductive layer 133, the heat shield layer 121, and the inner conductive layer 135.

For example, the sleeve 142 has a top end 138*a* and a bottom end 138*b* that is positioned opposite from the top end 138*a*. In particular, the top end 138*a* defines a top region of the sleeve 142 that is circular and planar (i.e., disk-shaped), while the bottom end 138*b* defines a bottom region of the sleeve 142 that is countersink, conical, or the like. As such, the top end 138*a* of the sleeve 142 may be positioned adjacent to the cover 141, while the bottom end 138*b* of the sleeve 142 may be positioned adjacent to the conical surface 143*d* of fastener head 143*a*. The sleeve may take one of a number of different shapes. For example, it may be quadrilateral, and/or the bottom region may be flat instead of conical.

The sleeve 142 may be any suitable type of housing fastening mechanism. For example, the sleeve 142 may be a top-hat sleeve, an anchor, an insulated component, an insulated housing structure, or the like. In an embodiment, the sleeve 142 has a top surface 142*a*, a bottom surface 142*b*, an outer surface 142*c*, an inner surface 142*d*, a bottom hole 142*e*, and an inner cavity 142*f* (e.g., as shown with the sleeve 142 in FIG. 5A). In an embodiment, the top and bottom surfaces 142*a-b* may be relative to the top end 138*a* of the sleeve 142. As such, the top surface 142*a* defines the top surface of the top end 138*a*, while the bottom surface of the top end 138*a* is defined by the bottom surface 142*b* that is opposite from the top surface 142*a*. With this configuration, the top surface 142*a* faces upwardly towards (or is interfaced with) the cover 141, as the bottom surface 142*b* faces downwardly towards the heat shield layer 121 and the body 115.

In the illustrated embodiments, the inner and outer surfaces 142*d-c* may be relative to the inner cavity 142*f* of the sleeve 142. The outer surface 142*c* faces away from the inner cavity 142*f* and is respectively interfaced (or engaged) with the heat shield layer 121 and/or the thermal washer 156*a*. The inner surface 142*d* faces towards the inner cavity 142*f* in which the inner surface 142*d* has an upper region that is exposed, and a lower region that is directly interfaced with the conical surface 143*d* of the fastener 143.

As shown in FIG. 4, the inner surface 142*d* may be comprised of a conical surface positioned by (or around, proximate to, etc.) the bottom end 138*b*, and a cylindrical surface positioned in the inner cavity 142*f*, where the cylindrical surface of the inner cavity 142*f* is substantially perpendicular to the top and bottom surfaces 141*a-b* of the cover 141. In one embodiment, the inner cavity 142*f* may be defined by the top surface 143*c* of the head 143*a*, the cylindrical surface of the inner surface 142*d* of the sleeve 142, and the bottom surface 141*b* of the cover 141. In addition, as the fastener 143 is positioned to extend through the bottom hole 142*e* of the sleeve 142, the bottom hole 142*e* prevents the fastener head 143*a* from passing through such hole 142*e* and secures the fastener head 143*a* within the inner cavity 142*f* of the sleeve 142. As such, the top surface 142*c* of the head 142*a* of the fastener 142 may be accessible (to the ambient environment) and substantially flush within the inner cavity 142*f* that is formed in the sleeve 142. That is, the fastener 143 includes the head 143*a* having a size and shape (e.g., having a countersunk head with a conical surface) that is directly seated within the conical surface of the inner surface 142*d* of the sleeve 142, where the size and shape of the head 143*a* allows the top surface 143*c* of the head 143 to be disposed substantially flush or coplanar with the respective top and bottom surfaces 141*a-b* of the cover 141.

The inner surface of the sleeve can be shaped to accommodate fasteners of different shapes. If the fastener head is flat, for example, the inner sleeve may terminate in a flat surface rather than a conical surface.

As shown in FIG. 4, to properly secure the fastener head 143*a* within the inner cavity 142*f* of the sleeve 142, the cover 141 is positioned directly on the top surface 142*a* of the top end 138*a*. The cover 141 may have an access hole 144, a top surface 141*a*, and a bottom surface 141*b* that is opposite to the top surface 141*a* (e.g., as shown with the access hole 144 in FIG. 5B). In the illustrated embodiment, the bottom surface 141*b* faces the sleeve 142 and is directly interfaced with the top surface 142*a* of the sleeve 142, while the top surface 141*a* faces the outer ambient environment and is exposed. In an embodiment, the cover 141 may be surrounded by at least one of the outer conductive layer 133 and the heat shield layer 121.

As noted above, the cover 141 may be welded or otherwise fastened directly to the sleeve 142 at region 139. The welded region 139 may be a circular outline or the like that is located on a periphery region of the welded cover and sleeve 141-142 (e.g., the welded region 139 may be located by the outer edges of the welded cover and sleeve 141-142). In an embodiment, the bottom surface 141*b* of the cover 141 may be laser welded to the top surface 142*a* of the sleeve 142 at such region 139 with any suitable welding process (or the like). While only one welded region 139 is shown in FIG. 4, it is to be appreciated that embodiments may include any number of welded regions 139 that may be located on any desired regions of the welded cover and sleeve 141-142.

The cover 141 may be any suitable type of enclosure fastening mechanisms. For example, the cover 141 may be a top hat cover, an insulated washer, a shim, an insulated top end, or the like. In some embodiments, the top surface 141*a* of the cover 141 may be substantially coplanar to the outer surface 131 of the thermal protection panel 130. As shown in FIG. 4, the access hole 144 is positioned directly over the top surface 143*c* of the fastener head 143*a*. Particularly, the access hole 144 is centrally aligned over the inner cavity 142*f* of the sleeve 142 and the drive slot 152 of the fastener head 143*a*, which offers a quick and unobstructed opening to engage the drive slot 152 within the inner cavity 142*f* of the welded cover and sleeve 141-142.

Figure 6A:
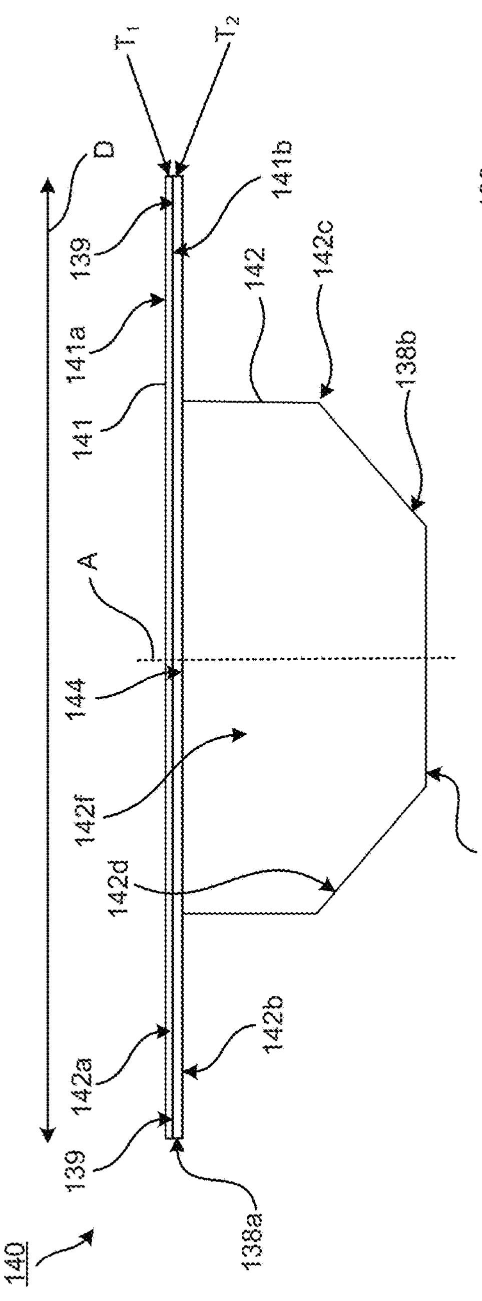
FIG. 6A is a cross-sectional illustration of a fastener assembly with a cover affixed to a sleeve, where the fastener assembly is aligned along an axis A, in accordance with an embodiment.

The fastener assembly 140 may include the cover 141 having a first disk-shaped cross-section with a first diameter, and the top end 138*a* of the sleeve 142 having a second disk-shaped cross-section with a second diameter (e.g., as shown in greater detail in FIG. 6A). For example, a disk-shaped cross-section may refer to a surface or a layer of a component along a cross-sectional axis, where the surface and/or the layer may be substantially circular, planar, and relatively thin. In one embodiment, the first diameter of the cover 141 may be substantially equal to or greater than the second diameter of the top end 138*a* of the sleeve 142. The first disk-shaped cross-section of the cover 141 may have a footprint that is greater than a footprint of the second disk-shaped cross-section of the top end 138*a* of the sleeve 142. As described herein, the footprint may be defined as a total surface area of a component, for example, such as a total surface area of the top surface 141*a* of the cover 141. The access hole 144 of the cover 141 may have a diameter that is substantially equal to a diameter of the drive slot 152 of the fastener 143. In one embodiment, the head 143*a* of the fastener 143 may have a diameter that is substantially greater than the diameter of the access hole 144 of the cover 141.

In one embodiment, the fastener assembly 140 may have a distance defined between the top surface 141*a* of the cover 141 and the tip of bottom end of the fastener 143. In some embodiments, the distance of the fastener assembly 140 may be approximately between 0.4 inches and 2.0 inches. In one embodiment, the distance of the fastener assembly 140 may be approximately equal to or greater than 0.4 inches. In one embodiment, the first disk-shaped cross-section of the cover 141 may have a first thickness that is substantially equal to a second thickness of the second disk-shaped cross-section of the top end 138*a* of the sleeve 142, where a combined thickness of the first thickness and the second thickness may be substantially equal to or less than 0.25 inches.

Accordingly, with both top surfaces of the respective panel 130 and the cover 141 being substantially coplanar to each other, the fastener assembly 140 provides a cost-effective and efficient approach to easily detach the fastener 143 within the thermal protection panel 130, which also facilitates the inspection and refurbishment of such panel 130 and any underlying critical components within the body 115, without the need to remove the heat shield layer 121, the panel 130, and any other thermal protection components.

Additionally, as shown in FIG. 4, the fastener assembly 140 may further include thermal washers 156*a-b* positioned around the fastener 143 (e.g., around the head 143*a* and the shank region 143*e* of the fastener 143) and the bottom end 138*b* of the sleeve 142. In an embodiment, the thermal washer 156*a* may include one or more materials that are different from the materials of the thermal washer 156*b*. For example, the thermal washer 156*a* may be a titanium alloy or the like (e.g., Ti-6Al-4V), while the thermal washer 156*b* may be a polymer resin or the like (e.g., glass-fiber reinforced grade of polyamide-imide (PAI) resin). In another embodiment, one or both washers may be conductive heat sinks, made of material with a high specific heat and high conductivity, such as aluminum. These heat-conductive washer(s) absorb heat that enters the fastener assembly, i.e., either through the hole 144 or via conduction through the assembly, and disperse it within the thermal protection system.

In the illustrated embodiment, the fastener assembly 140 also includes the nut plate 145 that securely attaches to the threaded region 143*b* of the fastener 143. The nut plate 145 may be positioned within the body 115 and secured to the body 115 using a lock pin 155 (or the like). In an embodiment, the fastener 143 extends through the heat shield layer 121, the inner conductive layer 135, and the body 115 to securely tighten the threaded region 143*b* to the nut plate 145, while the fastener head 143*a* remains protected and accessible within the inner cavity 142*f* of the welded cover and sleeve 141-142. Accordingly, the illustrated configuration of the fastener assembly 140 allows the outer conductive layer 133, the heat shield layer 121, and the inner conductive layer 135 to be securely coupled to each other, which thereby improves the overall structural integrity, reliability, and thermal protection of such panel 130.

Additionally, unlike the thermal protection panel 130 shown in FIG. 3, the thermal protection panel 130 in FIG. 4 more clearly illustrates the three separate layers 133, 121, and 135 within the outer and inner surfaces 131-132, and defines the configurations of such layers 133, 121, and 135 with respect to the fastener assembly 140. For example, as shown in FIG. 4, the heat shield layer 121 is positioned directly between and attached to the outer and inner conductive layers 133 and 135.

The outer conductive layer 133 may be a thin conductive layer that is positioned directly over the heat shield layer 121. In an embodiment, the outer conductive layer 133 may be formed from a conductive sheet (e.g., a sheet metal) with a thickness that is equal to or less than approximately 0.25 inches and cut into any desired size and shape. The outer conductive layer 133 may include conductive materials and/or fibers with a high strength and oxidation resistance at high temperatures (i.e., with a high-temperature resistance). For example, the conductive materials can retain their strength and oxidation resistance at temperatures approximately between 2000° F. and 3000° F., and some conductive materials can retain their strength and oxidation resistance at temperatures approximately greater than 3000° F. In some embodiments, the outer conductive layer 133 may be formed from one or more conductive materials such as titanium-based alloys, nickel-based alloys (e.g., Inconel alloys, Haynes alloys, or the like), quartz alloys, and/or refractory alloys (e.g., TZM alloys, C-103 alloys, or the like).

Figure 9:
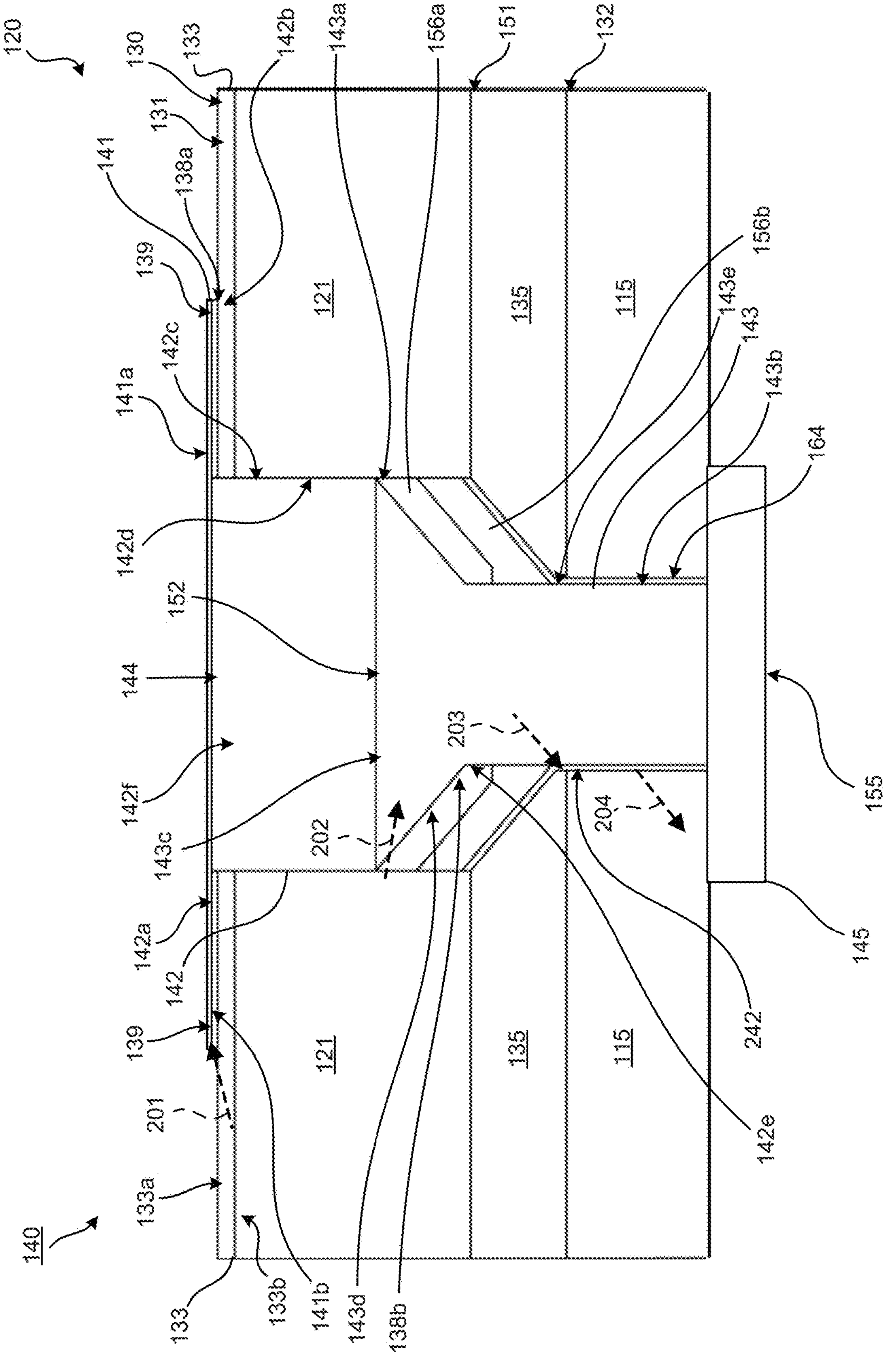
FIG. 9 is a detailed cross-sectional illustration of a fastener assembly with a continuous grounding path through a conductive layer, a cover, a fastener, and a grounded sleeve, in accordance with an embodiment.

Additionally, in some embodiments, the cover 141, the sleeve 142, and the fastener 143 may be formed from the same conductive materials that are used to form the outer conductive layer 133. That is, the cover 141, the sleeve 142, and the fastener 143 may comprise one or more conductive materials (or high-temperature conductive materials) that have a high strength and oxidation resistance and a high-temperature resistance. For example, each cover, sleeve, and fastener 141-143 may be formed from one or more conductive materials such as titanium-based alloys, nickel-based alloys (e.g., Inconel alloys, Haynes alloys, or the like), quartz alloys, refractory alloys (e.g., TZM alloys, C-103 alloys, or the like) and/or any other suitable materials with high strength and oxidation resistance at high temperatures. For example, the conductive materials used to form the cover, sleeve, and fastener 141-143 may retain their strength and oxidation resistance at temperatures approximately between 2000° F. and 3000° F., and/or retain their strength and oxidation resistance at temperatures approximately greater than 3000° F. In other embodiments, both the welded cover and sleeve 141-142 may be formed with the same conductive materials of the outer conductive layer 133, and the fastener 143 may be formed from iron-based alloys such as stainless steel, other suitable conductive materials such as molybdenum or niobium, and/or any combination thereof. That is, in such embodiments, the fastener 143 may be used for grounding applications in conjunction with other components (e.g., as shown in FIG. 9).

The outer conductive layer 133 has a top surface 133*a* and a bottom surface 133*b* that is opposite from the top surface 133*a*. The top surface 133*a* may be defined as the outer surface 131 of the panel 130, and as such, both the top surface 133*a* and the top surface 141*a* of the cover 141 may be substantially coplanar to each other. The bottom surface 133*b* may be positioned directly on the heat shield layer 121. As shown in FIG. 4, the heat shield layer 121 is positioned around the fastener assembly 140, and surrounds one or more components of the fastener assembly 140. In an embodiment, the heat shield layer 121 may have a portion directly interfaced with the top end 138*a*, bottom surface 142*b*, and outer surface 142*c* of the sleeve 142 and the thermal washers 156*a-b*.

In certain embodiments, the heat shield layer 121 is an insulation layer (e.g., a ceramic layer) formed from materials having high temperature capabilities and low thermal conductivity. In an embodiment, the heat shield layer 121 may be formed from a rigid and porous ceramic material having a low thermal conductivity, a high temperature resistance, and a low coefficient of thermal expansion (CTE). For example, the heat shield layer 121 may include one or more high-temperature insulation materials and/or fibers, including ceramics, silica, alumina, high-purity polycrystalline fibers, or the like.

The heat shield layer 121 may have a top surface 149 and a bottom surface 151 that is opposite from the top surface 149. The top surface 149 may be defined as the bottom surface 133*b* of the outer conductive layer 133, while the bottom surface 151 may be positioned directly on the inner conductive layer 135. In an embodiment, the inner conductive layer 135 may be positioned between and attached to the heat shield layer 121 and the body 115. The inner conductive layer 135 may have a portion that directly surrounds the thermal washer 156*b*.

The inner conductive layer 135 may be a thin conductive layer that is formed from a conductive sheet (e.g., a sheet metal) with a thickness that is equal to or less than approximately 0.25 inches and cut into any desired size and shape. In some embodiments, the inner conductive layer 135 may be formed with the same materials that are used to form the outer conductive layer 133. In other embodiments, the inner conductive layer 135 may be formed from different materials than the outer conductive layer 133. For example, in such embodiments, the inner conductive layer 135 may be formed from aluminum or any other suitable lightweight conductive materials.

In the illustrated embodiment, the top surface of the inner conductive layer 135 is defined as the bottom surface 151 of the heat shield layer 121, while the bottom surface of the inner conductive layer 135 is defined as the inner surface 132 of the thermal protection panel 130. Note that while one inner conductive layer 135 is shown in FIG. 4, it is to be appreciated that embodiments may include thermal protection panels 130 without the inner conductive layer 135 or any other layer such that the bottom surface 151 of the heat shield layer 121 is exposed and thus becomes the inner surface of such panel 130, which is respectively positioned directly on the body 115.

Figure 5B:
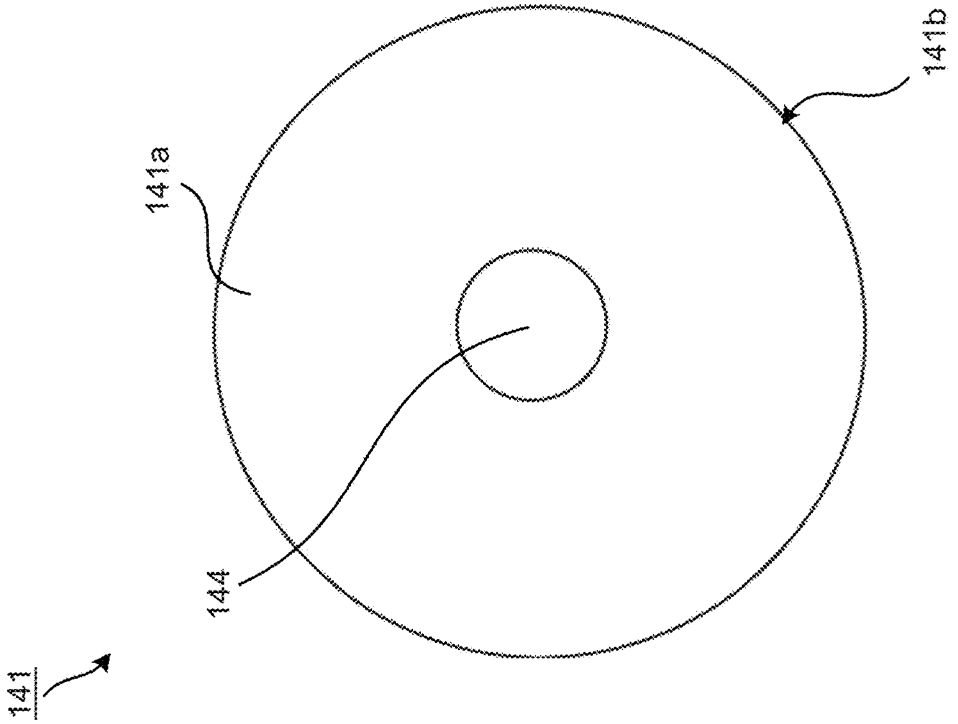
FIG. 5B is a plan view illustration of a cover, in accordance with an embodiment.
Figure 5A:
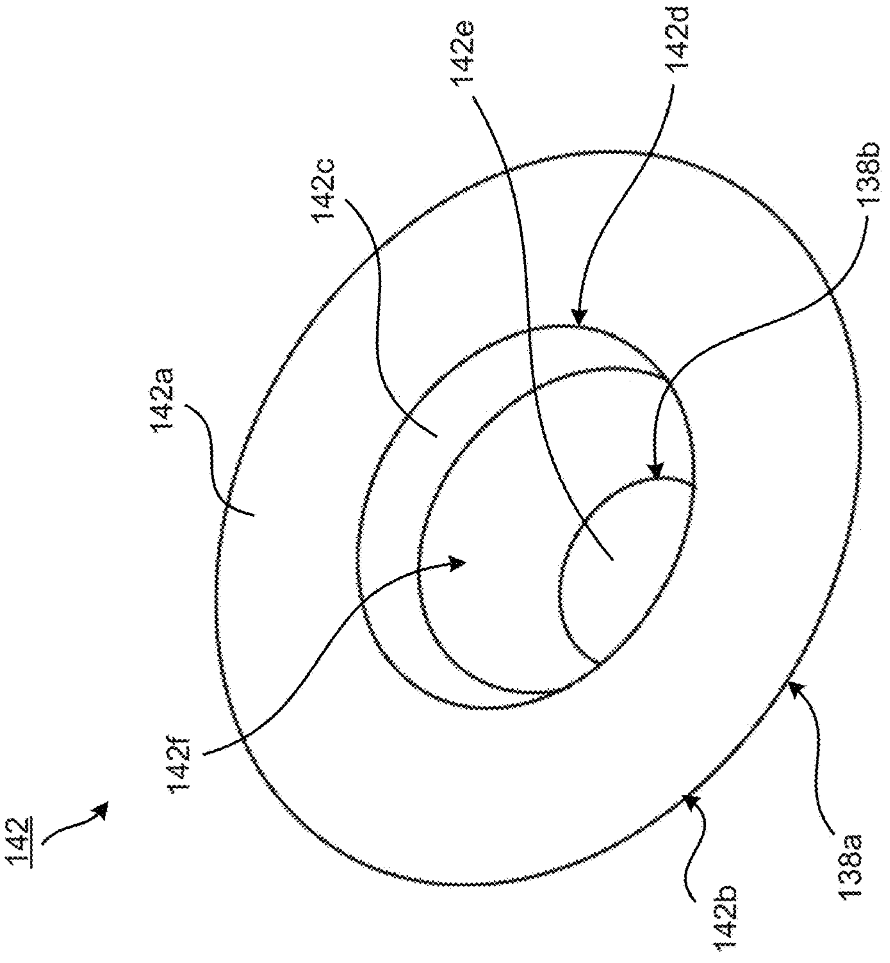
FIG. 5A is a detailed perspective view illustration of a sleeve, in accordance with an embodiment.

Referring now to FIGS. 5A-5B, a perspective view illustration of the sleeve 142 and a plan view illustration of the cover 141 are shown, in accordance with some embodiments. In an embodiment, the cover and sleeve 141-142 in FIGS. 5A-5B are the same components as the cover and sleeve 141-142 in FIG. 4, with the exceptions that the cover and sleeve 141-142 in FIGS. 5A-5B are shown as separate components before the cover and sleeve 141-142 are welded to each other. In an embodiment, the cover and sleeve 141-142 may be welded together with a laser or the like. As shown in FIGS. 5A-5B, the sleeve 142 and the cover 141 are configured separately prior to the welding process that securely laser welds the bottom surface 141*b* of the cover 141 to the top surface 142*a* of the top end 138*a* of the sleeve 142 (e.g., as shown with the welded cover and sleeve 141-142 in FIGS. 6A-6C).

Figure 6B:
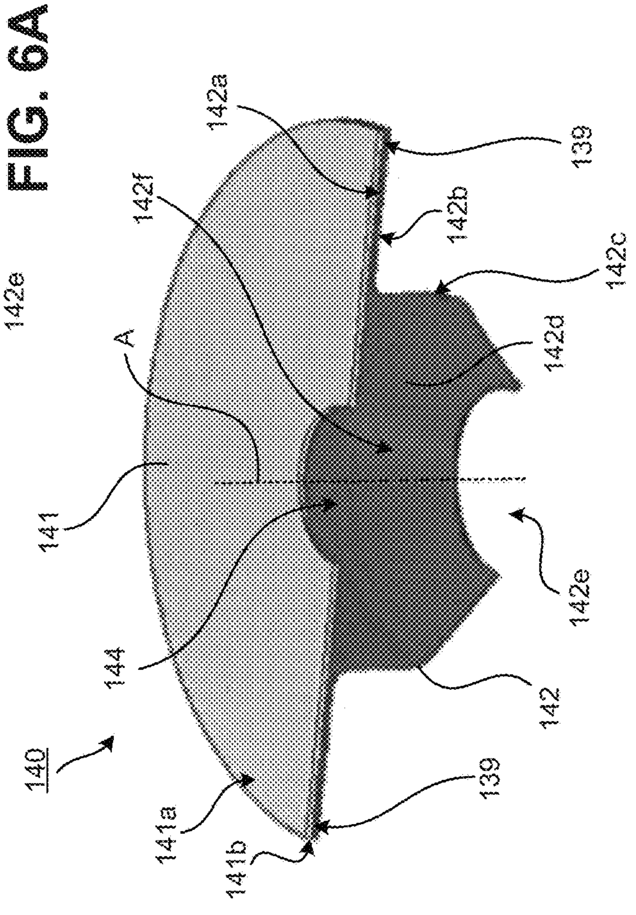
FIG. 6B is a perspective view illustration of the respective fastener assembly shown in FIG. 6A along the respective axis A, in accordance with an embodiment.
Figure 6C:
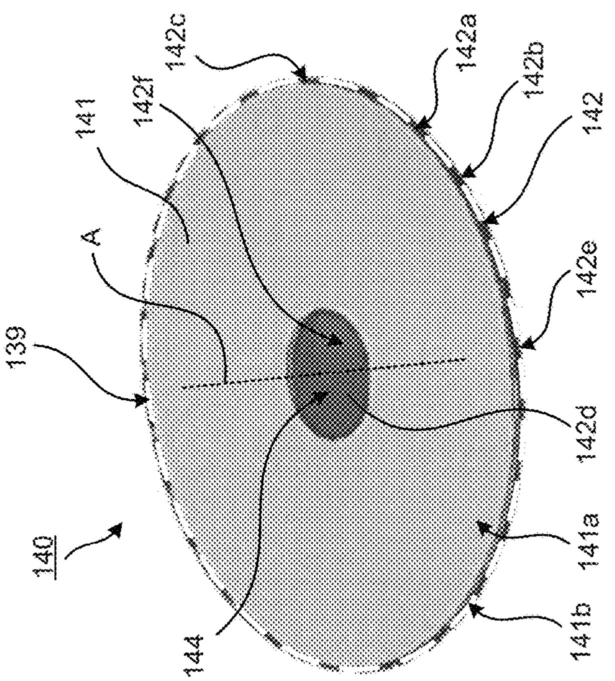
FIG. 6C is a plan view illustration of the respective fastener assembly shown in FIG. 6A along the respective axis A, in accordance with an embodiment.

Referring now to FIGS. 6A-6C, cross-sectional view and plan view illustrations of the welded cover and sleeve 141-142 of the fastener assembly 140 along axis line A are shown, in accordance with some embodiments. In an embodiment, the fastener assembly 140 in FIGS. 6A-6C is substantially similar to the fastener assembly in FIG. 4, with the exception that the welded cover and sleeve 141-142 are shown without the fastener 143 for illustrative simplicity. That is, unlike the fastener assembly 140 shown in FIGS. 6A-6C, the fastener assembly 140 in FIG. 4 may be configured by initially inserting the fastener 143 into the bottom hole 142*e* of the sleeve 142 to directly engage the fastener head 143*a* within the inner surface 142*d* of the sleeve 142, and then welding the cover 141 to the sleeve 142 to form the inner cavity 142*f* that fully secures the fastener head 143*a* within the welded cover and sleeve 141-142, in accordance with an embodiment.

As shown in FIGS. 6A-6C, the bottom surface 141*b* of the cover 141 may be laser welded to the top surface 142*a* of the top end 138*a* of the sleeve 142 at the welded region 139. In some embodiments, the welded region 139 may be located on the outer edges of both the cover and sleeve 141-142 (e.g., as particularly shown with the welded region 139 in FIG. 6C). In other embodiments, the welded region 139 may be located on one or more periphery regions of the cover and sleeve 141-142 (e.g., as shown with the welded region 139*b* in FIG. 8). Additionally, in an embodiment, the welded region 139 may form a circular outline or any other suitable pattern.

In some embodiments, the inner surface 142*d* of the sleeve 142 may be a conical-shaped surface that directly engages (and/or substantially matches) an outer surface of a fastener head (e.g., as shown with the conical surface 143*d* of the fastener head 143*a* in FIG. 4). However, it is appreciated that embodiments may include inner surfaces 142*d* with any desired shaped surface that may match the respective outer surface of any desired fastener head.

In some embodiments, as shown in FIG. 6A, the cover 141 may have a diameter D that is substantially equal to a diameter D of the top end 138*a* of the sleeve 142. In other embodiments, the cover 141 may have a diameter D that is greater than a diameter D of the top end 138*a* of the sleeve 142. In an embodiment, the diameter D may be approximately 1.025 inches. In an embodiment, the diameter D may be greater than approximately 1 inch. In some embodiments, the diameter D may be between approximately 1 inch and 2 inches.

Additionally, in some embodiments, the cover 141 may have a thickness $T_1$, and the top end 138*a* of the sleeve 142 may have a thickness $T_2$. In some embodiments, the cover 141 may have a thickness $T_1$ that is substantially equal to a thickness $T_2$ of the top end 138*a* of the sleeve 142. In other embodiments, the cover 141 may have a thickness $T_1$ that is different from a thickness $T_2$ of the top end 138*a* of the sleeve 142. In an embodiment, both thickness $T_1$ and thickness $T_2$ may be approximately 0.01 inches. In an embodiment, the thickness $T_1$ and/or the thickness $T_2$ may be greater than approximately 0.01 inch. Alternatively, it may be thinner. In an embodiment, the thickness $T_1$ and/or the thickness $T_2$ may be any suitable thickness based on the surface of the attached structure.

Figure 7:
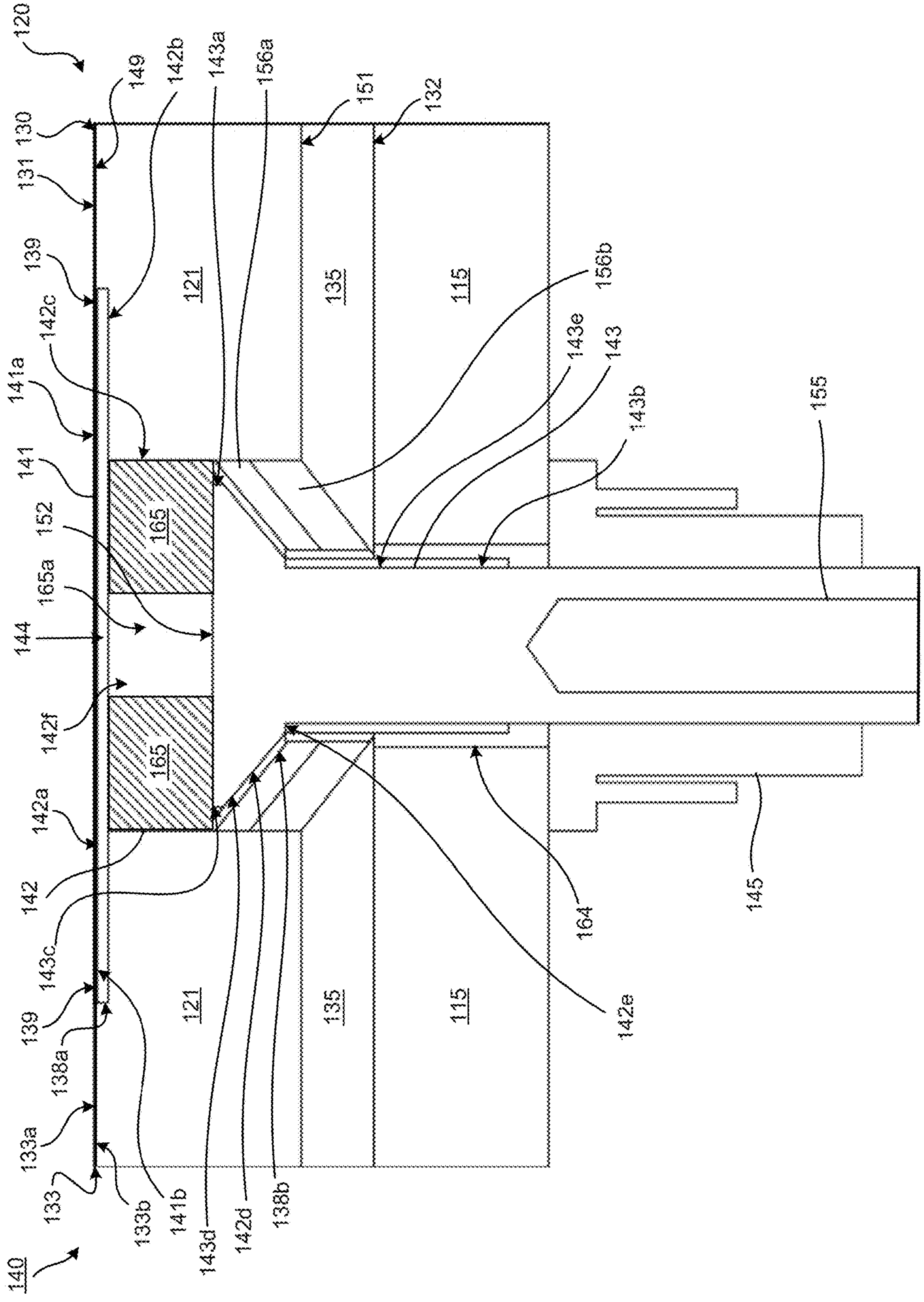
FIG. 7 is a detailed cross-sectional illustration of a fastener assembly with a thermal protection component that is entirely embedded in between a sleeve, a cover, and a fastener, in accordance with an embodiment.

Referring now to FIG. 7, a cross-sectional illustration of the fastener assembly 140 is shown, in accordance with an embodiment. In an embodiment, the fastener assembly 140 in FIG. 7 may be substantially similar to the fastener assembly 140 in FIG. 4, with the exception that a thermal protection component 165 is positioned within the inner cavity 142*f*. That is, the thermal protection component 165 is positioned between the bottom surface 141*b* of the cover 141 and the top surface 143*c* of the fastener head 143*a*. In an embodiment, the thermal protection component 165 may be formed from a material that has high temperature resistance and strength. For example, the thermal protection component 165 may be a thermal washer or the like that provides additional thermal protection to the fastener head 143*a*, and also provides an additional safety barrier such that the fastener head 143*a* may be substantially secured and not be dislodged. Additionally or alternatively, the cavity may be filled with any suitable insulation material.

In some embodiments, as shown in FIG. 7, the thermal protection component 165 may have a washer-type shape (e.g., circular and thinly planar) with a hole 165*a* that directly aligns with the access hole 144 and the drive slot 152. The hole 165*a* may have a diameter that is substantially equal to or greater than a diameter (or width/length) of the drive slot 152. In an embodiment, the thermal protection component 165 may be formed from insulative materials having a low thermal conductivity, a high temperature resistance, and a low CTE. For example, the thermal protection component 165 may include one or more rigid and porous ceramic materials, high-temperature insulation materials and/or fibers, and/or any other suitable materials, including ceramics, silica, alumina, high-purity polycrystalline fibers, or the like. For example, the thermal protection component 165 may be formed from one or more materials that are similarly used to form the heat shield layer 121. Whereas, in other embodiments, the thermal protection component 165 may be formed from materials (or a combination of such materials) that are similarly used to from one or more of the cover, sleeve, and fastener 141-143.

In some embodiments, the thermal protection component 165 may be configured on the fastener head 143*a* prior to positioning the cover 141 over the thermal protection component 165 and the fastener head 143*a*, and then welding the cover 141 to the sleeve 142 to fully secure both the thermal protection component 165 and fastener head 143*a*. However, in other embodiments, the thermal protection component 165 may be configured through the access hole 144 using a thermal deposition or coating process (or the like). In some embodiments, the thermal protection component 165 may have a thickness substantially equal to a thickness that is defined between the bottom surface 141*b* of the cover 141 and the top surface 143*c* of the fastener head 143*a*. In other embodiments, the thermal protection component 165 may have a thickness less than a thickness that is defined between the bottom surface 141*b* of the cover 141 and the top surface 143*c* of the fastener head 143*a*.

Figure 8:
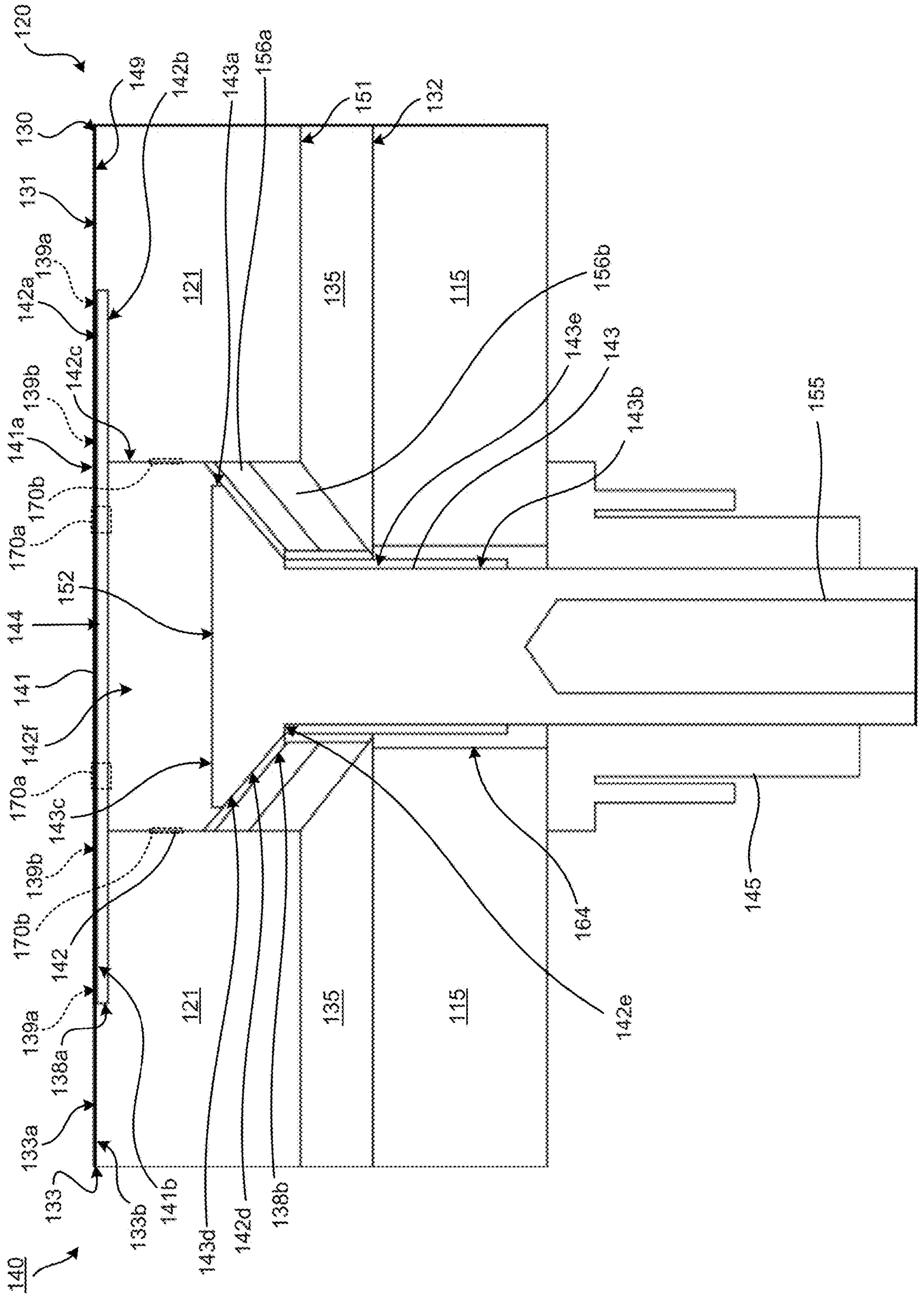
FIG. 8 is a detailed cross-sectional illustration of a fastener assembly with one or more holes that are formed on a cover and/or a sleeve, in accordance with an embodiment.

Referring now to FIG. 8, a cross-sectional illustration of a fastener assembly 140 is shown, in accordance with an embodiment. In an embodiment, the fastener assembly 140 in FIG. 8 may be substantially similar to the fastener assembly 140 in FIG. 4, with the exceptions that one or more holes 170*a-b* may be positioned through the cover 141 and/or the sleeve 142, and that the welded cover 141 may have one or more welded regions 139*a-b*.

For example, the holes 170*a-b* may be formed through the cover 141 and/or the sleeve 142 to help with the thermal protection and air circulation of both the fastener assembly 140 and thermal protection panel 130. In an embodiment, the holes 170*a* may include any number of total holes formed through the cover 141 (e.g., the holes 170*a* may form a circular outline or the like). In an embodiment, the holes 170*b* may include any number of total holes formed through the sleeve 142. In addition, as shown in FIG. 8, the welded cover and sleeve 141-142 may have a first welded region 139*a*, a second welded region 139*b*, and/or both welded regions 139*a-b*.

Referring now to FIG. 9, a cross-sectional illustration of the fastener assembly 140 is shown, in accordance with an embodiment. In an embodiment, the fastener assembly 140 in FIG. 9 may be substantially similar to the fastener assembly 140 in FIG. 4, with the exceptions that the cover 141 and top end 138*a* of the sleeve 142 are positioned over the outer conductive layer 133, and that a ground sleeve 242 is positioned within the thermal protection panel 130 and surrounds the threaded region 143*b* of the fastener 143. For example, with this illustrated configuration in FIG. 9, the fastener assembly 140 may be used to facilitate a clean ground path 201-204 for discharge through both the fastener assembly 140 and panel 130. That is, the fastener assembly 140 with the ground sleeve 242 may be electrically conductive and capable of discharging electricity and/or avoiding charge buildup due to lightning, static charges, and/or other sources.

As shown in FIG. 9, the ground path at 201 may carry an electric charge (or current) from the outer conductive layer 133 to the cover 141. Thereafter, the ground path at 202 may carry such electric charge from the welded cover and sleeve 141-142 to the fastener head 143*a*, and then towards the ground sleeve 242. For example, the ground sleeve 242 may be formed from any conductive material that is highly capable of discharging electrical current and that has suitable strength and thermal characteristics in relation to the fastener assembly 140. Lastly, the ground path at 204 may discharge the electric charge through the grounding sleeve 242 towards the frame (e.g., aluminum frame) of the body 115. Accordingly, the illustrated fastener assembly 140 ultimately provides a good grounding path for p-static, an additional ground path for lightning, and a good alignment configuration with such panel 130.

Figure 10:
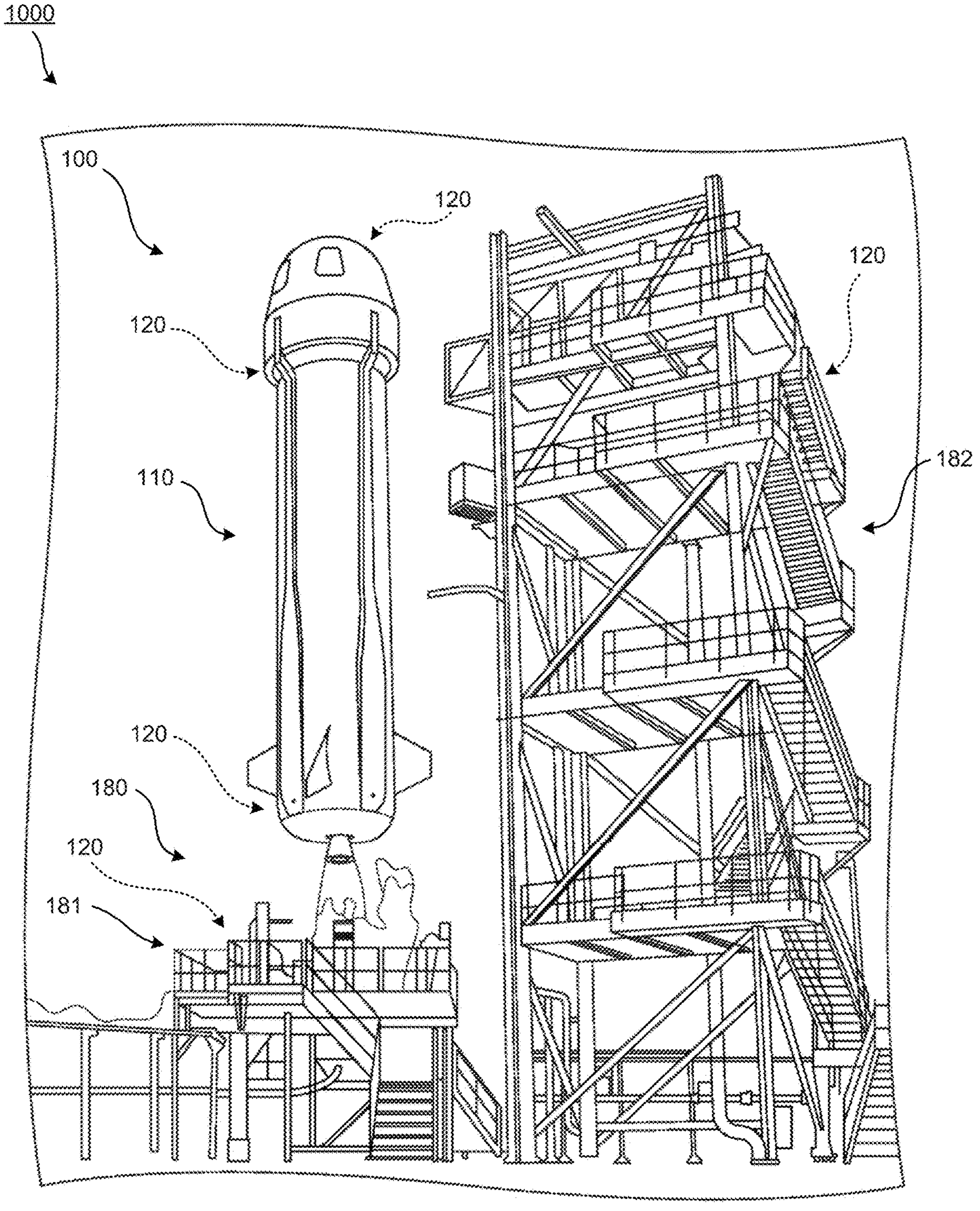
FIG. 10 is an isometric view illustration of a launch site, a launch vehicle, and one or more thermal protection systems in which the launch vehicle is launching off from the launch site, in accordance with an embodiment.

Referring now to FIG. 10, an isometric view illustration of a launch site system 1000 with the launch vehicle 110 and one or more thermal protection systems 120 in FIG. 1 is shown, in accordance with an additional embodiment. In an embodiment, the launch vehicle 110 and thermal protection system 120 in FIG. 10 may be substantially similar to the launch vehicle 110 and thermal protection system 120 in FIG. 1, with the exception that the thermal protection system 120 may be positioned on both the launch vehicle 110 and other high-temperature structures 180-182. For example, the launch site system 1000 enables the launch vehicle 110 to be launched off from a launch site 180, in accordance with an embodiment.

In addition to providing cooling and insulation to portions of the launch vehicle 110, the thermal protection system 120 with the fastener assemblies 140 described herein may be used to provide cooling and insulation to other portions of the system. For example, as shown in FIG. 10, the launch vehicle 110 takes off from a launch site 180 that has a platform 181 and a tower 182. Before the launch vehicle 110 takes off from the launch site 180, the launch vehicle 110 is positioned in a generally vertical orientation on the platform 181 and coupled to the tower 182, which is used to stabilize and service the launch vehicle 110. For example, when the launch vehicle 110 is secured at the launch site 180, the tower 182 may be used to access a payload (e.g., as shown with the payload 116 in FIG. 1) within the launch vehicle 110. Further, both the platform 181 and the tower 182 may include supply conduits that provide supplies (e.g., fuel, water, air, etc.) to the launch vehicle 110 and various ground service equipment (e.g., cables, sensors, control systems, etc.) used during the launch of the launch vehicle 110.

Heat given off by the propulsion system when the launch vehicle 110 lifts off may damage the platform 181 and/or the tower 182, including the supply conduits, electronic components, and other components. To protect these and other portions of the launch site 180, the thermal protection system 120 may be securely attached to at least some portions of the launch site 180 with the fastener assemblies (e.g., as shown with the fastener assemblies 140 in FIGS.

1-4). For example, the thermal protection system 120 may be applied to the ground service equipment that houses various electronic components and cables so as to protect the electronic components from damage. The thermal protection system 120 may also be applied to portions of the tower 182 adjacent to a second stage of the launch vehicle 110 (e.g., a shelter room) so that technicians, astronauts, or other personnel are protected from high temperatures.

In the foregoing specification, embodiments have been described with reference to specific exemplary embodiments thereof. It should be borne in mind, however, that all of these and similar terms are to be associated with the appropriate physical quantities and are merely convenient labels applied to these quantities. It will be evident that various modifications may be made thereto without departing from the broader spirit and scope. The specification and drawings are, accordingly, to be regarded in an illustrative sense rather than a restrictive sense.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize.

These modifications may be made to the invention in light of the above detailed description. The terms used in the following claims should not be construed to limit the invention to the specific implementations disclosed in the specification and the claims. Rather, the scope of the invention is to be determined entirely by the following claims, which are to be construed in accordance with established doctrines of claim interpretation.

What is claimed is:

1. A fastener assembly, comprising:
- a sleeve having a hole, an inner surface, a top end, and a bottom end that is opposite from the top end, wherein the top end has a planar surface, wherein the sleeve has a cylindrical surface that is substantially perpendicular to the planar surface, and wherein the hole is positioned at the bottom end;
- a fastener downwardly extending through the hole of the sleeve, wherein the fastener includes a drive slot, a head, a shank, and a threaded region, wherein the head is positioned entirely within the bottom end of the sleeve, wherein the drive slot is positioned on a top surface of the head, wherein the head is positioned at a first end of the fastener, wherein the threaded region is positioned proximate to a second end of the fastener that is opposite from the first end, and wherein the head is separated from the threaded region by the shank; and
- a cover directly disposed on the top end of the sleeve, wherein the cover has an access hole, a bottom surface, and a top surface that is opposite from the bottom surface, wherein the bottom surface is affixed to the planar surface of the sleeve, wherein an inner cavity is defined by the top surface of the head, the cylindrical surface of the inner surface of the sleeve, and the bottom surface of the cover, and wherein the access hole is positioned directly over the drive slot of the fastener, and wherein the cover, the sleeve, and the fastener comprises one or more materials having a high temperature resistance and a high strength and oxidation resistance.

2. The fastener assembly of claim 1, wherein the one or more materials comprise metal-based alloys, and wherein the metal-based alloys comprise titanium-based alloys, nickel-based alloys, quartz alloys, or refractory alloys.

3. The fastener assembly of claim 1, wherein the top surface of the head of the fastener is accessible within the sleeve.

4. The fastener assembly of claim 1, wherein the cover has a first disk-shaped cross-section with a first diameter, wherein the top end of the sleeve has a second disk-shaped cross-section with a second diameter, and wherein the first diameter of the cover is substantially equal to or greater than the second diameter of the top end of the sleeve.

5. The fastener assembly of claim 4, wherein the first disk-shaped cross-section of the cover has a footprint that is greater than a footprint of the second disk-shaped cross-section of the top end of the sleeve.

6. The fastener assembly of claim 4, wherein a distance is defined between the top surface of the cover and the second end of the fastener, wherein the distance is approximately between 0.4 inches and 2.0 inches, wherein the first disk-shaped cross-section of the cover has a first thickness that is substantially equal to a second thickness of the second disk-shaped cross-section of the top end of the sleeve, wherein a combined thickness of the first thickness and the second thickness is substantially equal to or less than 0.25 inches, and wherein the first diameter of the cover is approximately between 1.0 inch and 1.05 inches.

7. The fastener assembly of claim 1, wherein the access hole of the cover has a diameter that is substantially equal to a diameter of the drive slot of the fastener.

8. The fastener assembly of claim 7, wherein the head of the fastener has a diameter that is substantially greater than the diameter of the access hole of the cover.

9. The fastener assembly of claim 1, comprising:
- one or more thermally conductive washers surrounding the shank of the fastener; and
- a nut plate affixed to the second end of the fastener, wherein the nut plate has a thread region that is securely engaged with the thread region of the fastener.

10. A fastener assembly, comprising:
- a sleeve having a hole, an inner surface, a top end, and a bottom end that is opposite from the top end, wherein the top end has a planar surface, wherein the sleeve has a cylindrical surface that is substantially perpendicular to the planar surface, and wherein the hole is positioned at the bottom end;
- a fastener downwardly extending through the hole of the sleeve, wherein the fastener includes a drive slot, a head, a shank, and a threaded region, wherein the head is entirely within the bottom end of the sleeve, wherein the drive slot is positioned on a top surface of the head, wherein the head is positioned at a first end of the fastener, wherein the threaded region is positioned proximate to a second end of the fastener that is opposite from the first end, and wherein the head is separated from the threaded region by the shank; and
- a cover directly disposed on the top end of the sleeve, wherein the cover has an access hole, a bottom surface, and a top surface that is opposite from the bottom surface, wherein the bottom surface is directly affixed to the planar surface of the sleeve, wherein an inner cavity is defined by the top surface of the head, the cylindrical surface, and the bottom surface of the cover, wherein the access hole is positioned directly over the drive slot of the fastener, and wherein the cover, the sleeve, and the fastener comprises one or more materials having a high temperature resistance and a high strength and oxidation resistance; and a thermal protection component positioned within the inner cavity, wherein the thermal component extends from the bottom surface of the cover and the top surface of the head of the fastener, and wherein the thermal component has a hole that is centrally aligned with the access hole of the cover and the drive slot of the fastener.

11. The fastener assembly of claim 10, wherein the thermal protection component comprises one or more second materials having a low thermal conductivity and a high temperature resistance, wherein the one or more conductive materials comprise metal-based alloys, and wherein the metal-based alloys comprise titanium-based alloys, nickel-based alloys, quartz alloys, or refractory alloys.

12. The fastener assembly of claim 11, wherein the top surface of the head of the fastener is accessible within the sleeve, wherein the cover has a first disk-shaped cross-section with a first diameter, wherein the top end of the sleeve has a second disk-shaped cross-section with a second diameter, and wherein the first diameter of the cover is substantially equal to or greater than the second diameter of the top end of the sleeve.

13. The fastener assembly of claim 12, wherein the first disk-shaped cross-section of the cover has a footprint that is greater than a footprint of the second disk-shaped cross-section of the top end of the sleeve, wherein the access hole of the cover has a diameter that is substantially equal to a diameter of the drive slot of the fastener, wherein the head of the fastener has a diameter that is substantially greater than the diameter of the access hole of the cover.

14. The fastener assembly of claim 13, wherein a thickness is defined between the top surface of the cover and the second end of the fastener, wherein the thickness is approximately between 0.4 inches and 2.0 inches, wherein the first disk-shaped cross-section of the cover has a first thickness that is substantially equal to a second thickness of the second disk-shaped cross-section of the top end of the sleeve, wherein a combined thickness of the first thickness and the second thickness is substantially equal to or less than 0.25 inches, and wherein the first diameter of the cover is approximately between 1.0 inch and 1.05 inches.

15. The fastener assembly of claim 10, comprising:

one or more thermally conductive washers surrounding the shank of the fastener;

one or more supplemental holes formed through at least one or more of the cover and the sleeve, wherein the supplemental holes expose the inner cavity; and a nut plate affixed to the second end of the fastener, wherein the nut plate has a thread region that is securely engaged with the thread region of the fastener.

* * * * *